United States Patent [19]
Iftikar et al.

[11] Patent Number: 6,049,444
[45] Date of Patent: Apr. 11, 2000

[54] ROTATABLE DOOR AND DOOR OPENING MECHANISM FOR A CARTRIDGE

[75] Inventors: Syed H. Iftikar, Fremont; Herbert E. Thompson, Los Gatos; Teong-Hoe Kay, San Jose; Albert J. Guerini, Gilroy, all of Calif.

[73] Assignee: Syquest Technology, Inc., Fremont, Calif.

[21] Appl. No.: 08/977,467

[22] Filed: Nov. 24, 1997

Related U.S. Application Data

[63] Continuation of application No. 08/357,856, Dec. 15, 1994, Pat. No. 5,831,790, which is a continuation of application No. 07/977,262, Nov. 13, 1992, Pat. No. 5,440,436.

[51] Int. Cl.[7] ................................................ G11B 23/03
[52] U.S. Cl. ............................................. 360/133; 369/291
[58] Field of Search ............................. 360/97.01, 99.01, 360/99.04, 99.08, 133, 99.12; 369/291

[56] References Cited

U.S. PATENT DOCUMENTS

| | | |
|---|---|---|
| 3,299,581 | 1/1967 | Price et al. .................................. 51/165 |
| 3,531,788 | 9/1970 | Brown et al. ......................... 340/174.1 |
| 3,761,097 | 9/1973 | Borman ........................................ 274/4 |
| 4,045,821 | 8/1977 | Fujikura ................................... 360/132 |
| 4,131,199 | 12/1978 | Hatchett et al. ......................... 360/133 |
| 4,320,430 | 3/1982 | Vogt ......................................... 360/133 |
| 4,400,748 | 8/1983 | Bauck et al. ............................... 360/99 |
| 4,459,628 | 7/1984 | Barton ...................................... 360/133 |
| 4,503,474 | 3/1985 | Nigam ...................................... 360/133 |
| 4,504,879 | 3/1985 | Toldi et al. ............................... 360/105 |
| 4,532,564 | 7/1985 | Larson et al. ............................ 360/133 |
| 4,543,619 | 9/1985 | Pastor ......................................... 360/97 |
| 4,550,354 | 10/1985 | Wakabayashi et al. ................. 360/133 |
| 4,559,575 | 12/1985 | Noto et al. ............................... 360/133 |
| 4,608,617 | 8/1986 | Oishi et al. ............................... 360/133 |
| 4,628,385 | 12/1986 | Janssen et al. ............................. 360/99 |
| 4,663,682 | 5/1987 | McNeil ..................................... 360/105 |
| 4,683,506 | 7/1987 | Toldi et al. ............................... 360/105 |
| 4,688,127 | 8/1987 | Oishi et al. ............................... 360/132 |
| 4,717,981 | 1/1988 | Nigam et al. ............................ 360/133 |
| 4,722,012 | 1/1988 | Toldi et al. ................................. 360/97 |
| 4,755,981 | 7/1988 | Ekhoff ...................................... 369/270 |
| 4,823,214 | 4/1989 | Davis ..................................... 360/97.01 |
| 4,864,452 | 9/1989 | Thompson et al. ...................... 360/133 |
| 4,870,518 | 9/1989 | Tompson et al. ..................... 360/97.01 |
| 4,879,621 | 11/1989 | Chamberlin et al. .................... 360/133 |
| 4,901,173 | 2/1990 | Jones et al. ........................... 360/99.04 |
| 4,943,880 | 7/1990 | Muehlhausen et al. ................. 360/133 |
| 4,965,684 | 10/1990 | Stefansky .............................. 360/78.12 |

(List continued on next page.)

FOREIGN PATENT DOCUMENTS

| | | |
|---|---|---|
| 0161718 A2 | 9/1982 | European Pat. Off. . |
| WO 93/00679 | 6/1992 | WIPO . |
| WO 93/18507 | 3/1993 | WIPO . |
| 3-12055 | of 0000 | Japan . |

*Primary Examiner*—Brian E. Miller
*Attorney, Agent, or Firm*—Lyon & Lyon LLP

[57] ABSTRACT

A cartridge adapted to be inserted into a disk drive where the disk drive includes a read/write head and a finger for engaging the cartridge. The cartridge includes a housing defining a cartridge door port and a door control port, a rotatable media within the housing, a door that rotates about a pivot point between a closed position and an open position, a portion of the door blocking access to the rotatable media through the cartridge door port when the door is closed, and a door opening link having a first end and a second end, the first end being coupled to the door closer to the pivot point of the door than to the portion of the door that blocks the cartridge door port, the second end being movable between a closed location and an open location. The door is in the closed position when the second end of the door opening link is in the closed location, and the door is in the open position when the second end of the door opening link is in the open location. The door control port is adapted to permit the finger of the disk drive to extend through the door control port and push the second end of the door opening link from the closed location to the open location as the cartridge is inserted into the drive.

23 Claims, 24 Drawing Sheets

U.S. PATENT DOCUMENTS

| | | | |
|---|---|---|---|
| 4,965,685 | 10/1990 | Thompson et al. | 360/97.01 |
| 4,965,691 | 10/1990 | Iftikar et al. | 360/133 |
| 4,974,103 | 11/1990 | Iftikar et al. | 360/97.01 |
| 4,982,303 | 1/1991 | Krenz | 360/137 |
| 5,027,241 | 6/1991 | Hatch et al. | 360/105 |
| 5,046,170 | 9/1991 | Oshima et al. | 360/133 |
| 5,060,106 | 10/1991 | Davis et al. | 360/133 |
| 5,073,889 | 12/1991 | Rayner | 369/291 |
| 5,113,297 | 5/1992 | Yoshida | 360/99.06 |
| 5,126,890 | 6/1992 | Wade et al. | 360/60 |
| 5,140,478 | 8/1992 | Yoshida | 360/97.01 |
| 5,175,657 | 12/1992 | Iftikar et al. | 360/98.01 |
| 5,204,704 | 4/1993 | Genno et al. | 346/76 |
| 5,204,793 | 4/1993 | Plonczak | 360/97.01 |
| 5,204,794 | 4/1993 | Yoshida | 360/133 |
| 5,214,550 | 5/1993 | Chan | 360/97.01 |
| 5,216,558 | 6/1993 | Griffith et al. | 360/99.06 |
| 5,218,503 | 6/1993 | Martin | 360/133 |
| 5,235,481 | 8/1993 | Kamo et al. | 360/97.01 |
| 5,247,511 | 9/1993 | Koike et al. | 360/263 |
| 5,260,931 | 11/1993 | Sasaki et al. | 369/291 |
| 5,262,918 | 11/1993 | Tannert | 360/133 |
| 5,280,403 | 1/1994 | Martin | 369/133 |
| 5,291,355 | 3/1994 | Hatch et al. | 360/97.01 |
| 5,317,464 | 5/1994 | Witt et al. | 360/99.08 |
| 5,379,171 | 1/1995 | Morehouse et al. | 360/105 |
| 5,381,402 | 1/1995 | Lee et al. | 369/291 |
| 5,481,420 | 1/1996 | Cardona et al. | 360/99.06 |
| 5,486,964 | 1/1996 | Morehouse et al. | 360/105 |
| 5,543,986 | 8/1996 | Albrecht | 360/105 |
| 5,550,695 | 8/1996 | Matsumoto | 360/105 |
| 5,581,424 | 12/1996 | Dunfield et al. | 360/105 |
| 5,585,980 | 12/1996 | Boutaghou | 360/105 |
| 5,615,070 | 3/1997 | Bordes | 360/133 |
| 5,636,095 | 6/1997 | McGrath et al. | 360/133 |
| 5,724,216 | 3/1998 | Iftikar et al. | 360/133 |
| 5,822,162 | 10/1998 | Tannert | 360/133 |

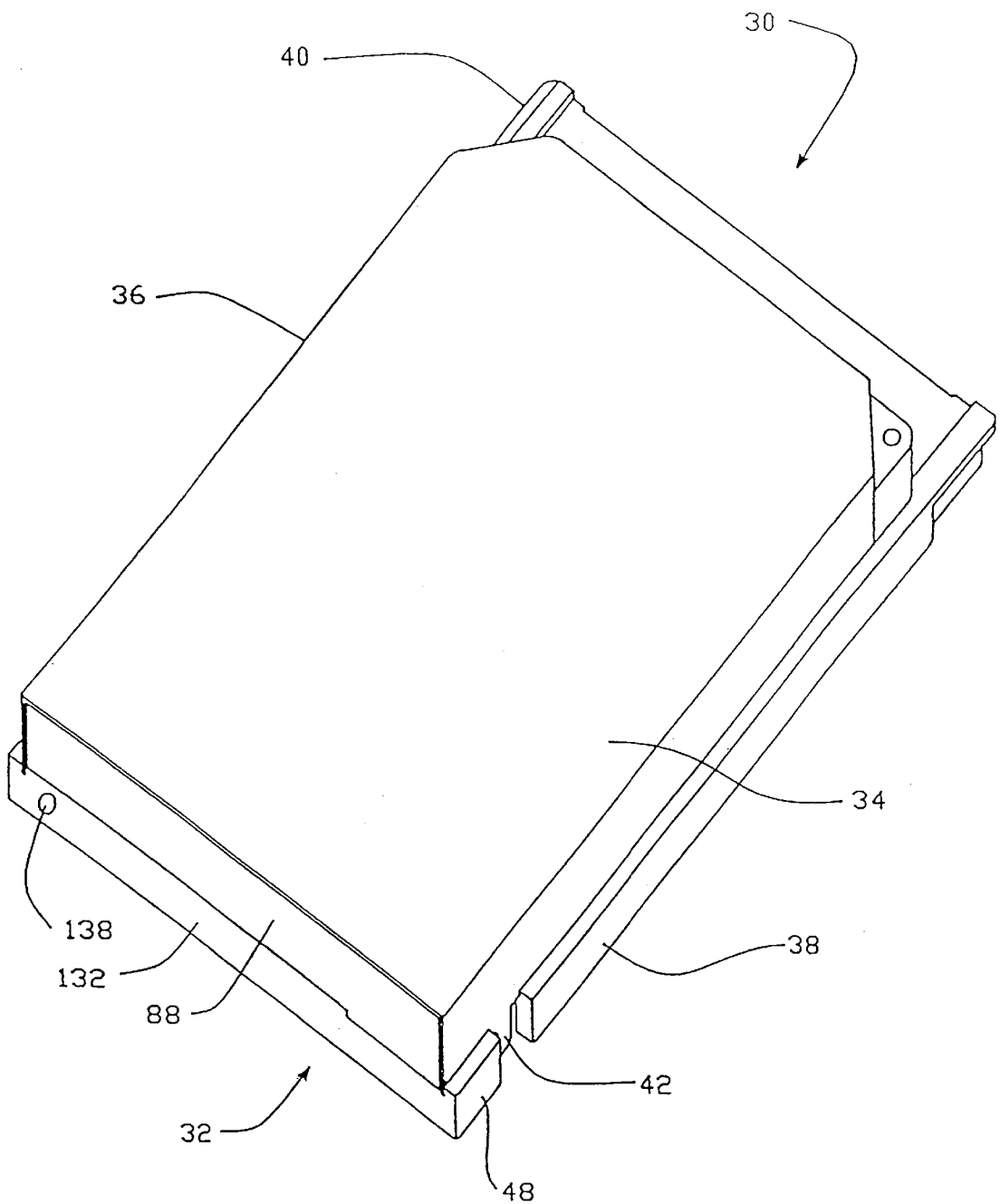
FIG.—1

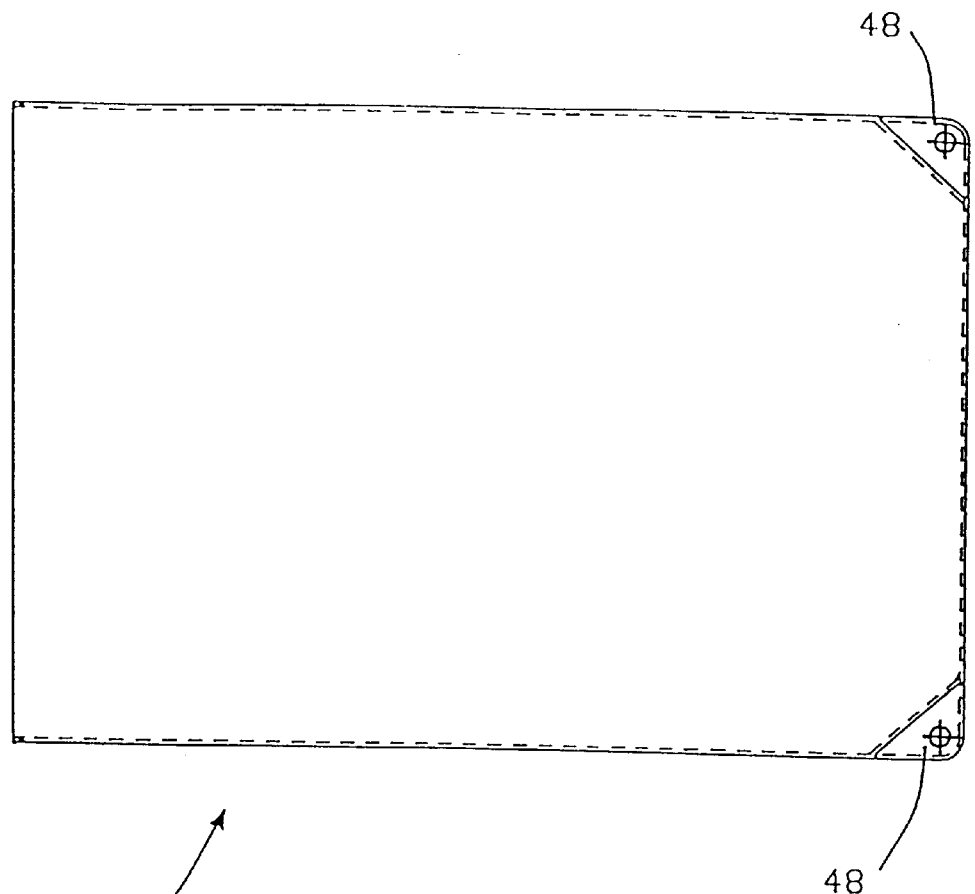
FIG.—2a
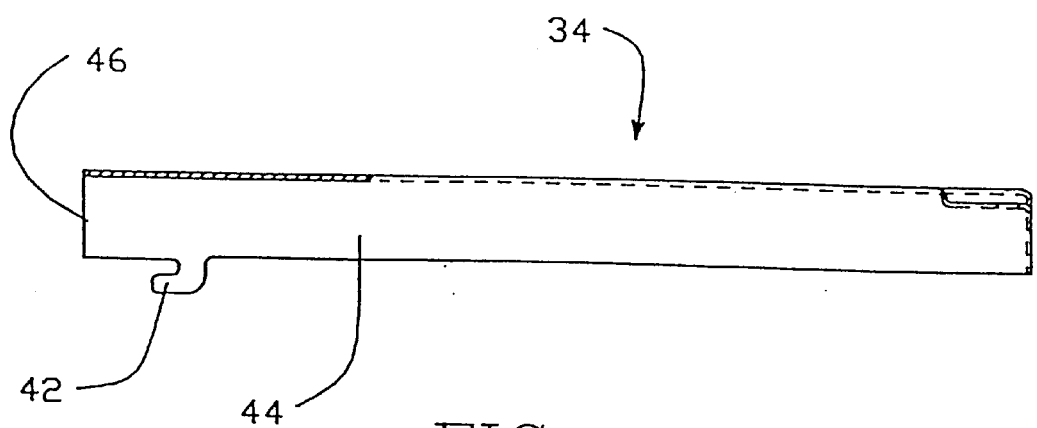
FIG.—2b

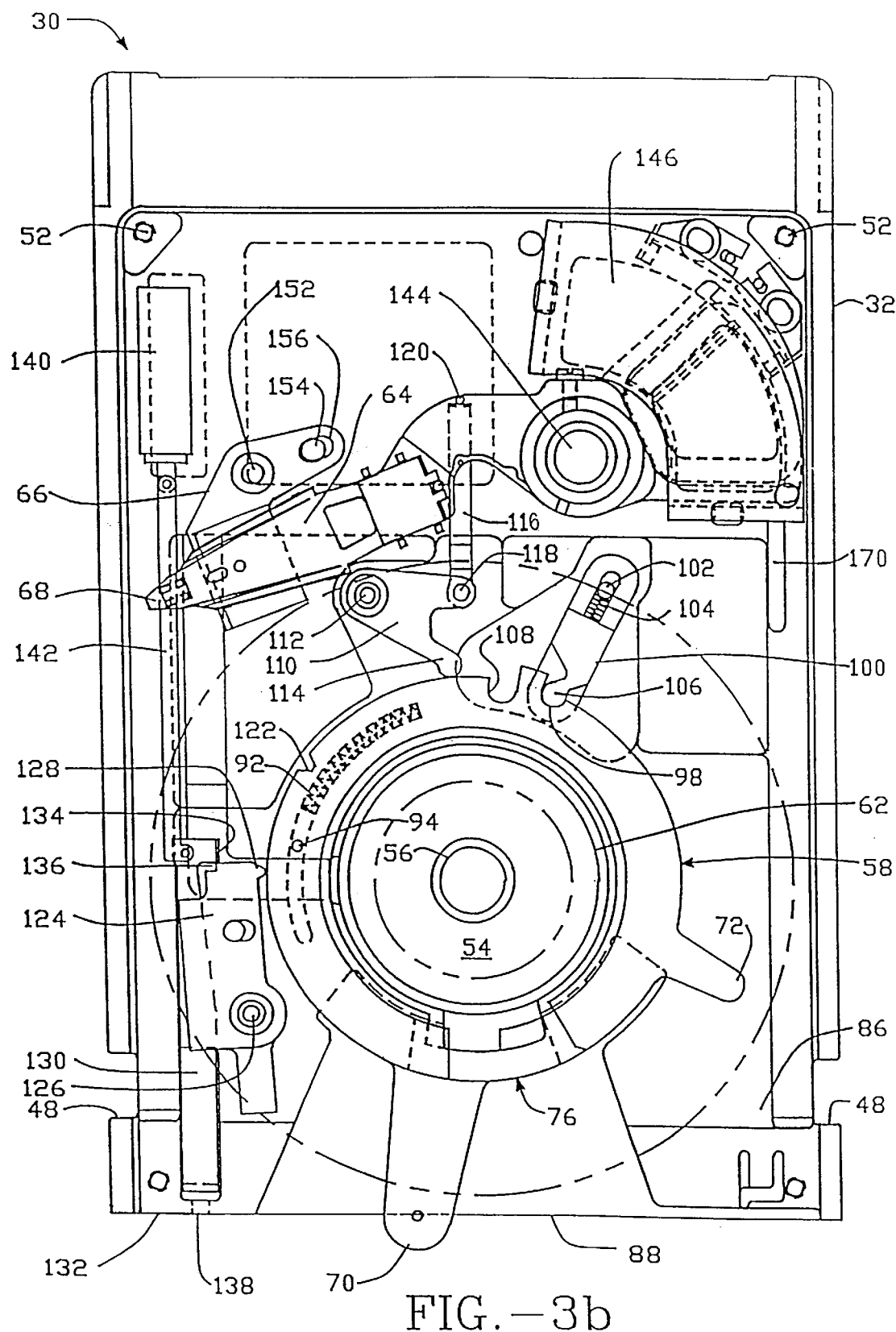
FIG.—3b

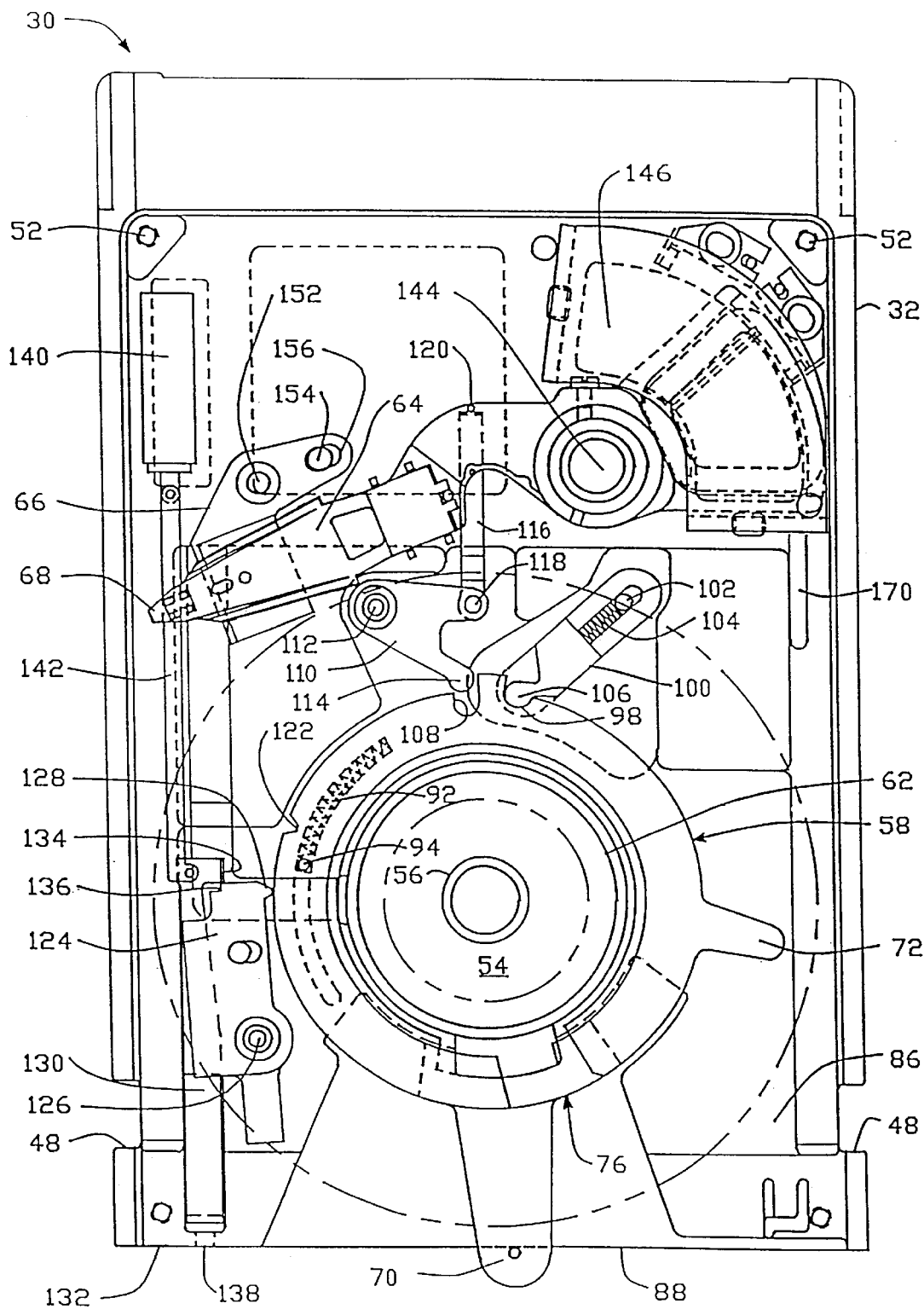
FIG.—3c

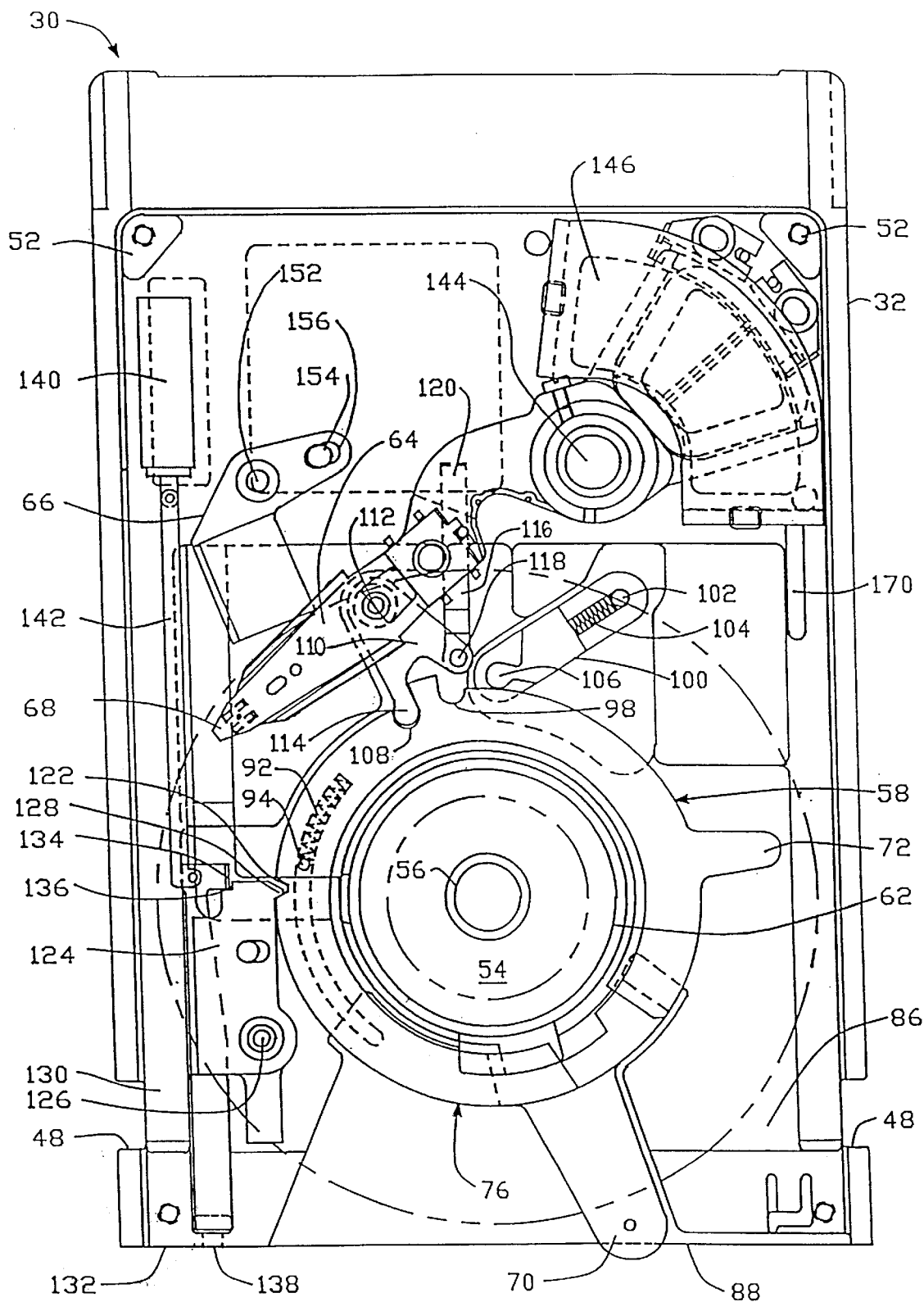
FIG.—3d

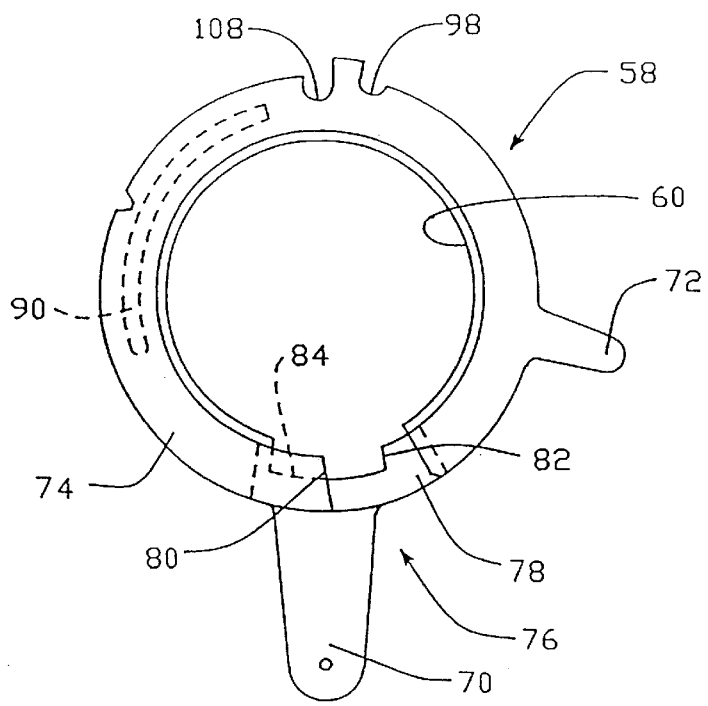
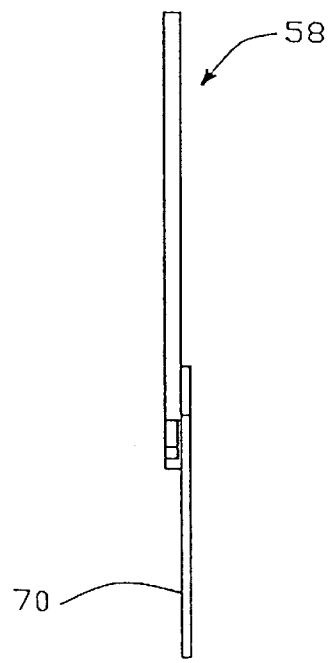
FIG.—4a
FIG.—4c
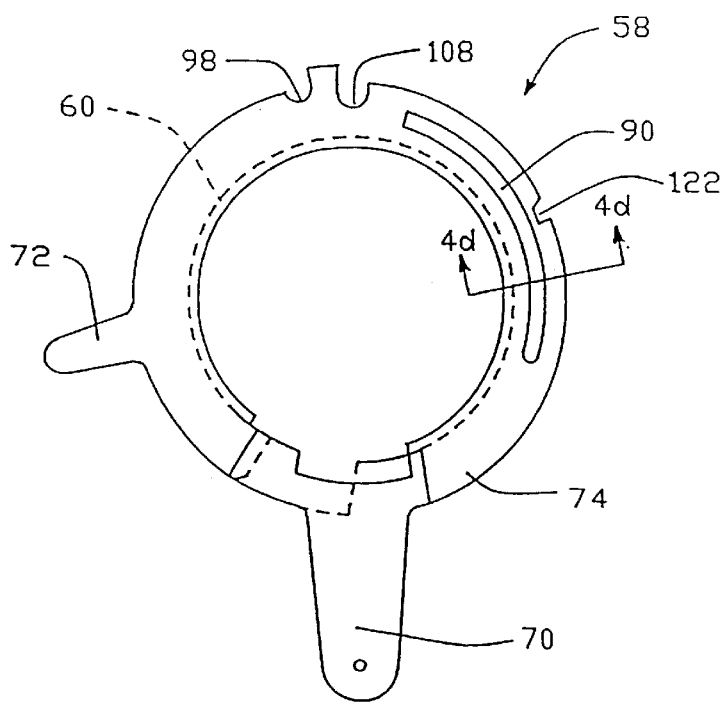
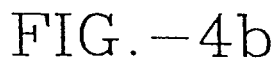
FIG.—4b
FIG.—4d

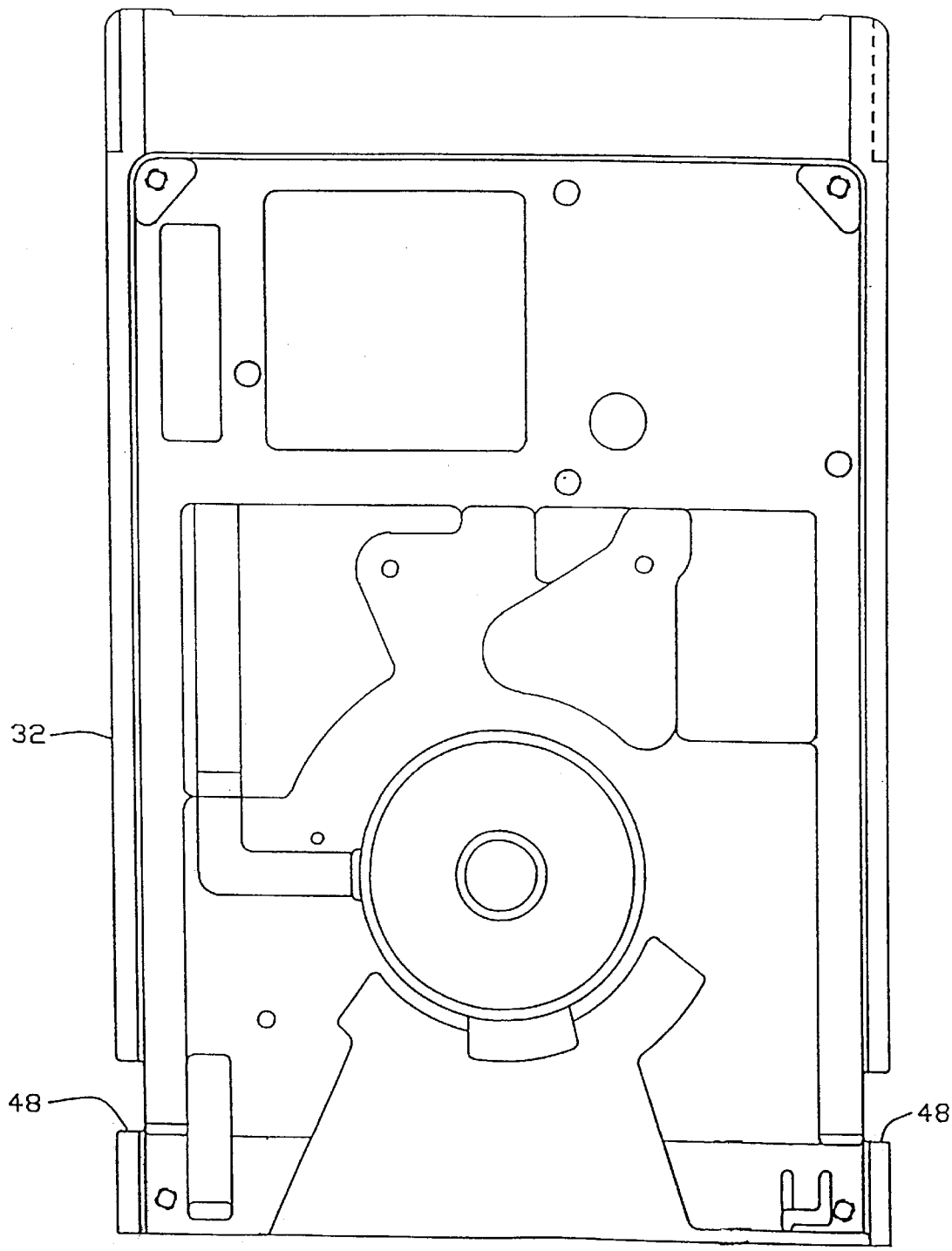
FIG.—5

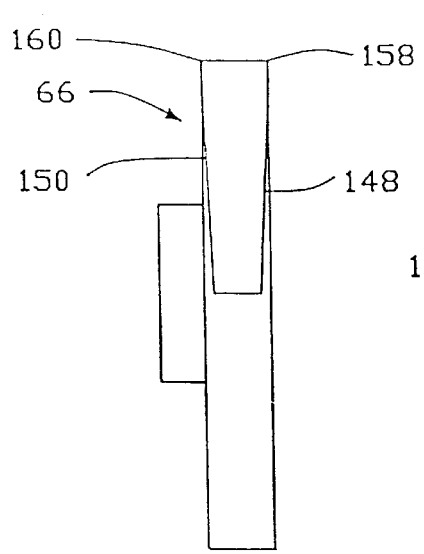
FIG.—6a
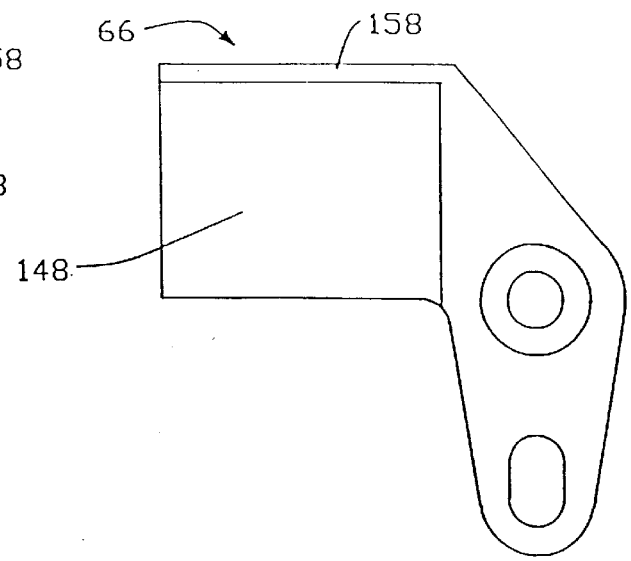
FIG.—6b
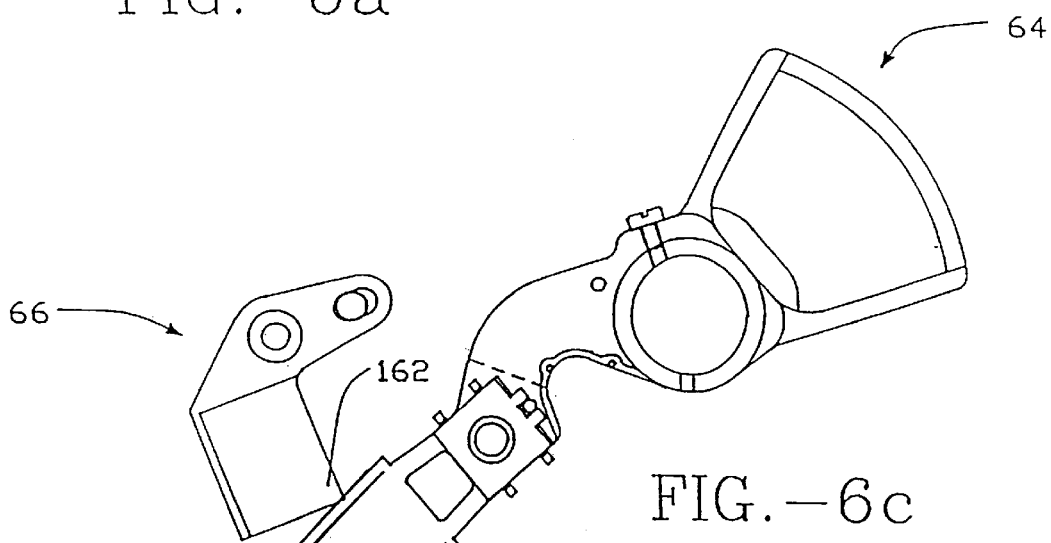
FIG.—6c
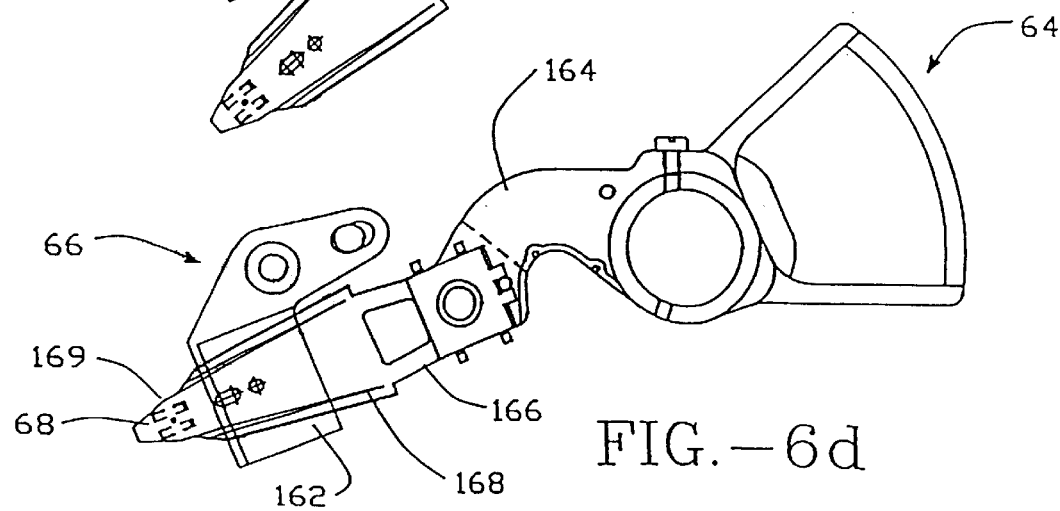
FIG.—6d

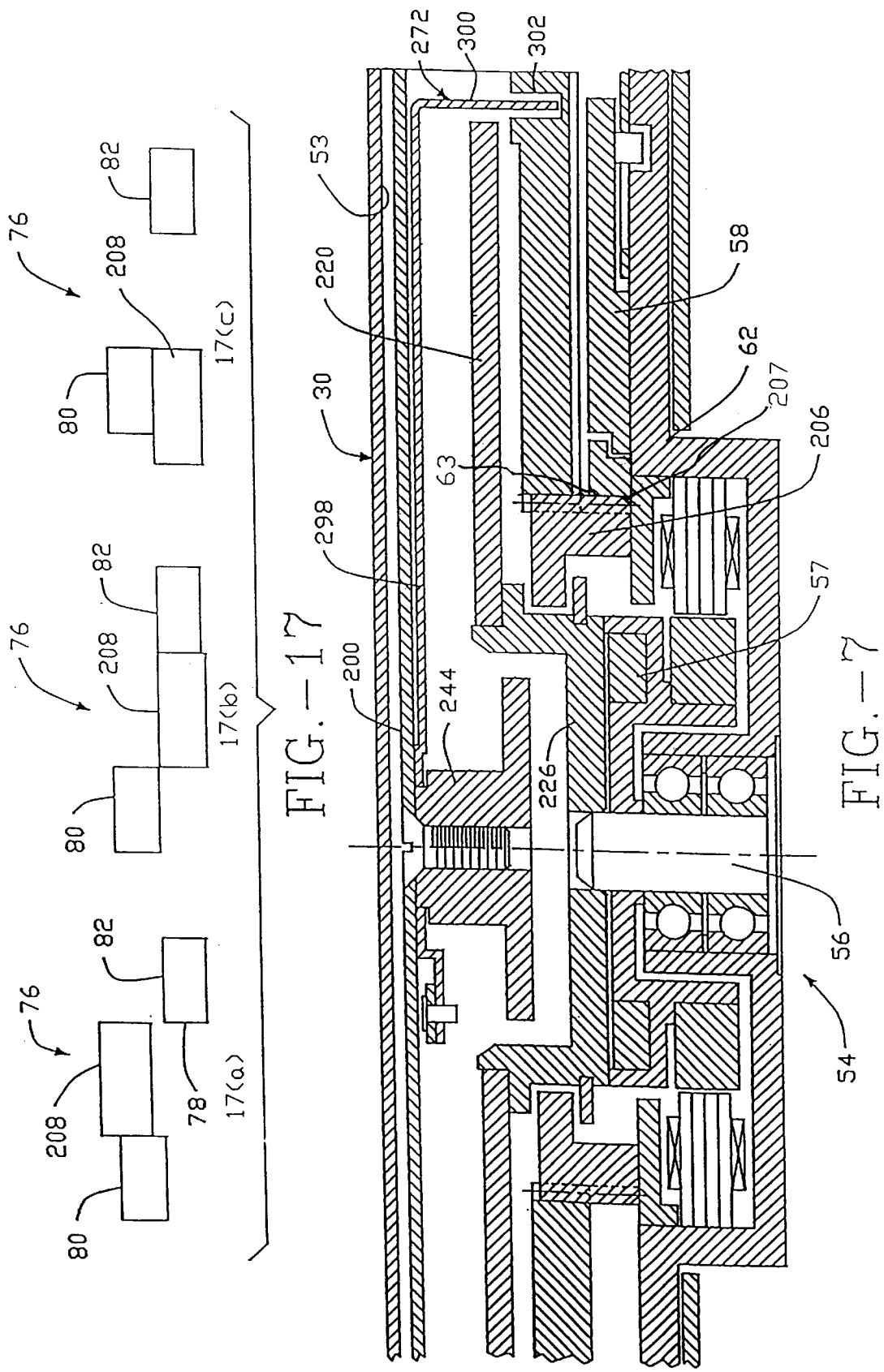

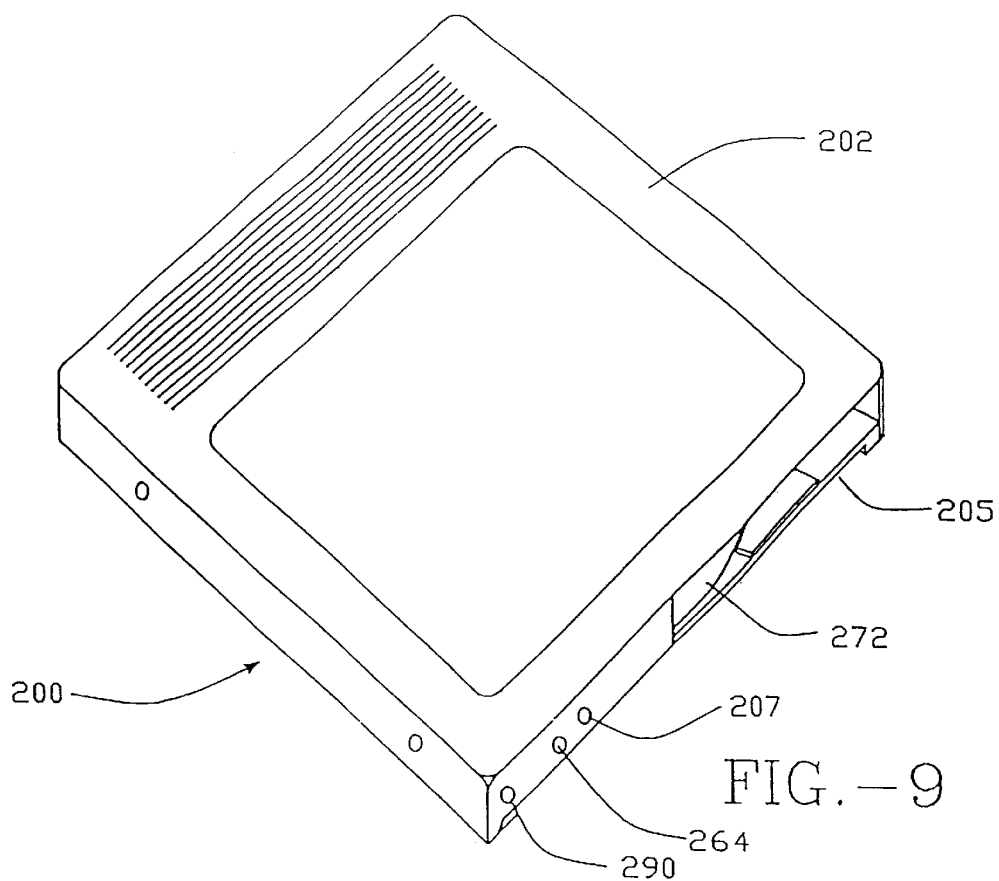
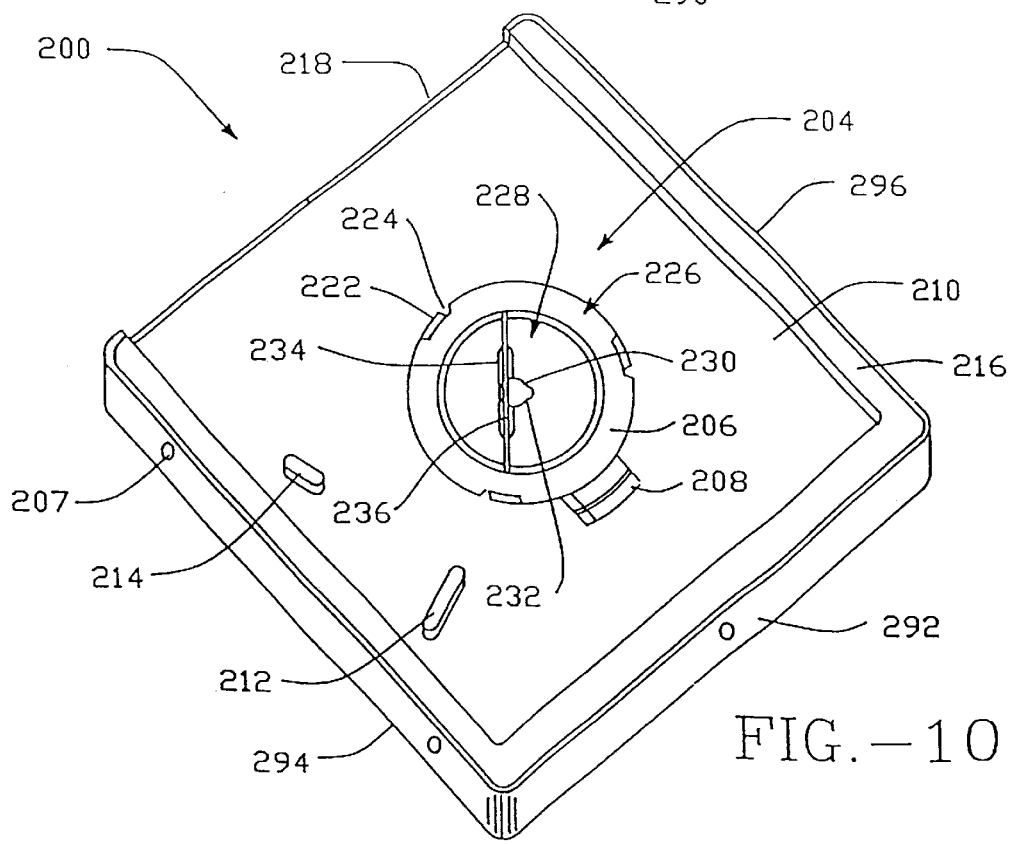

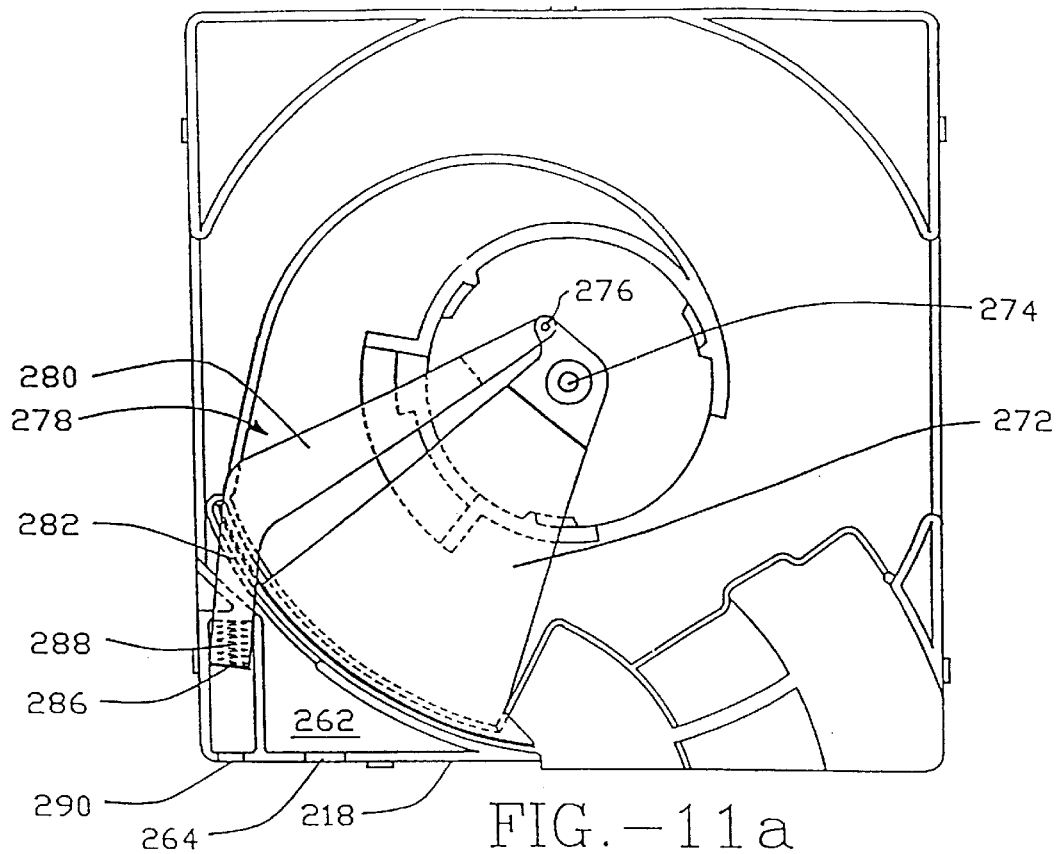
FIG.—11a
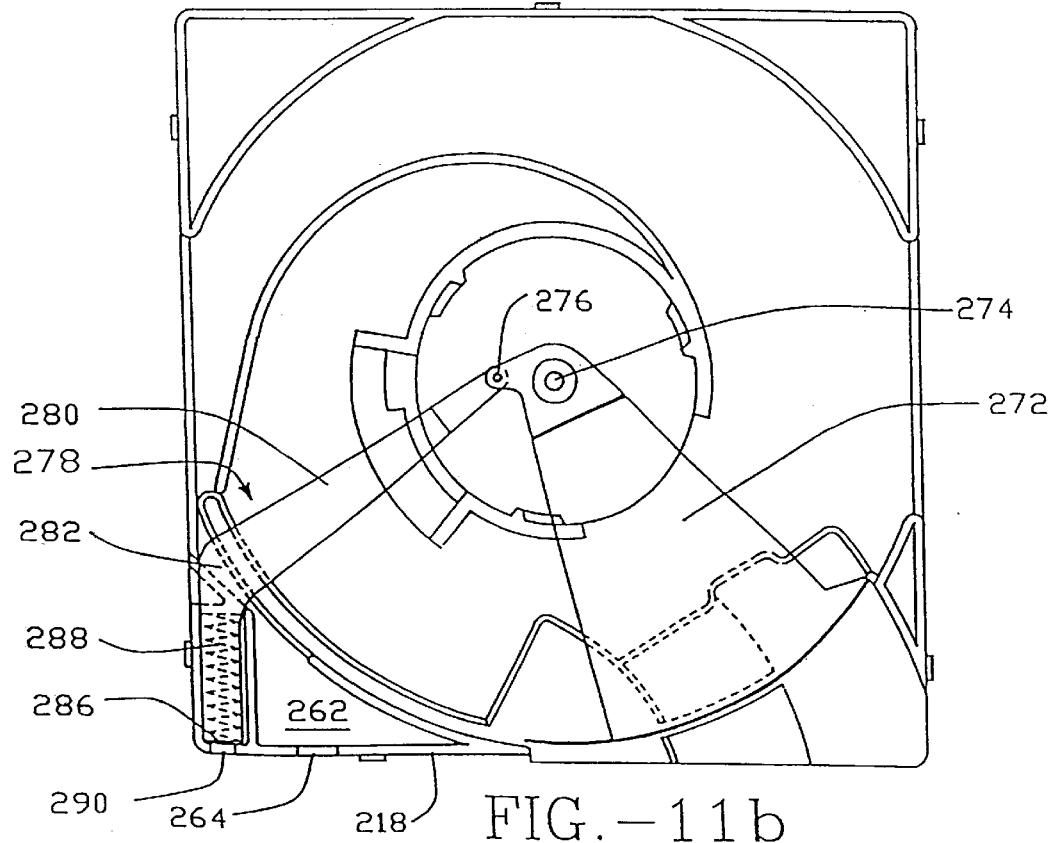
FIG.—11b

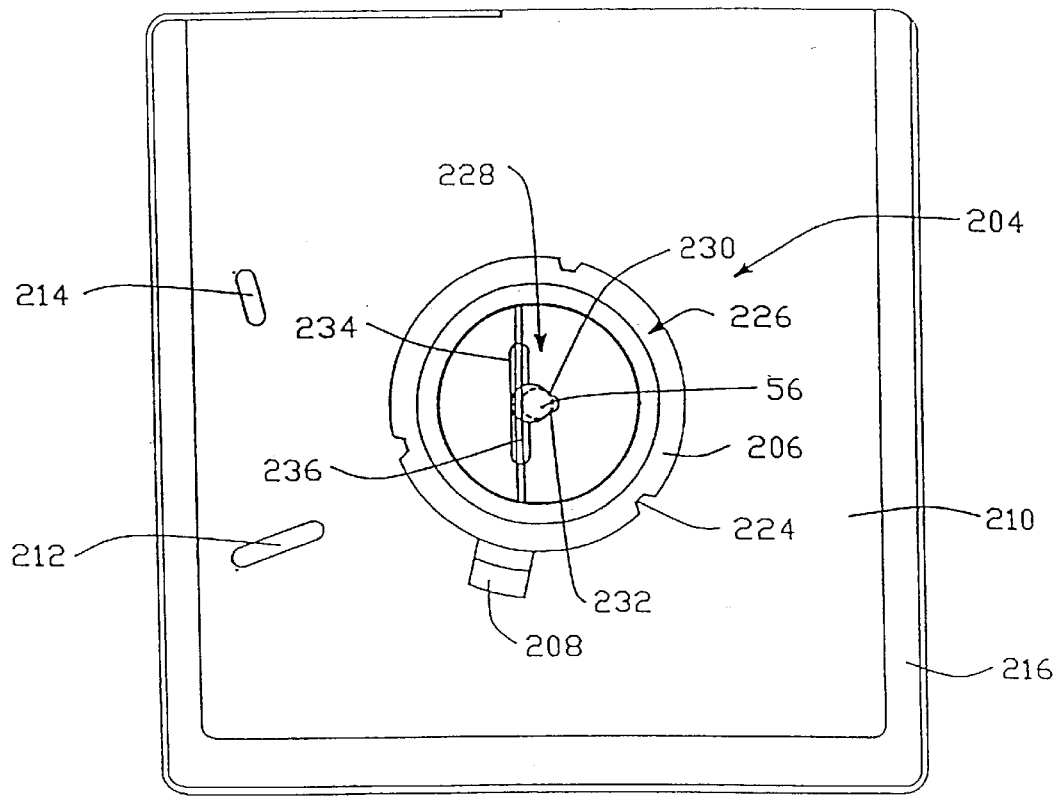
FIG.—12a
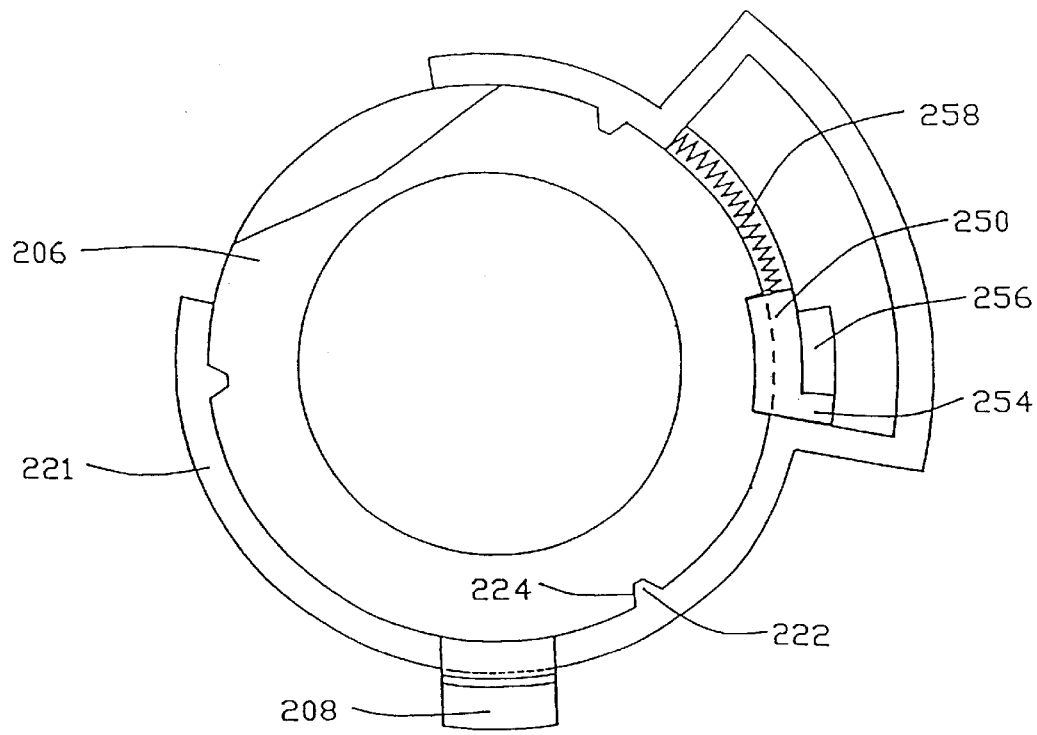
FIG.—12b

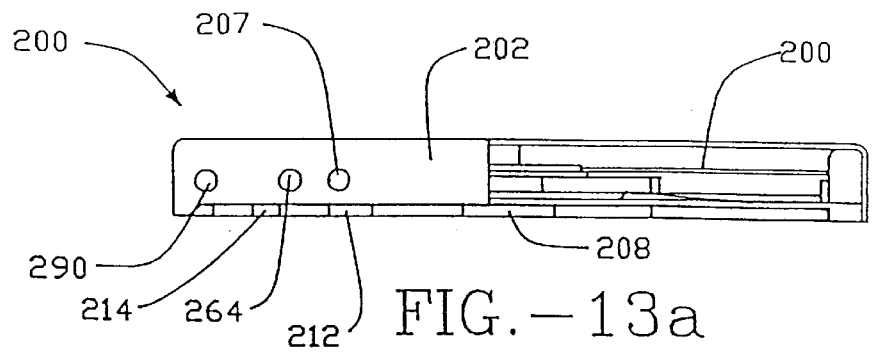
FIG.—13a
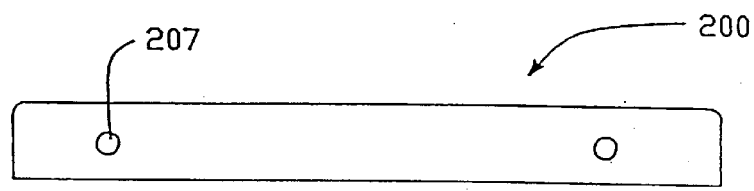
FIG.—13b
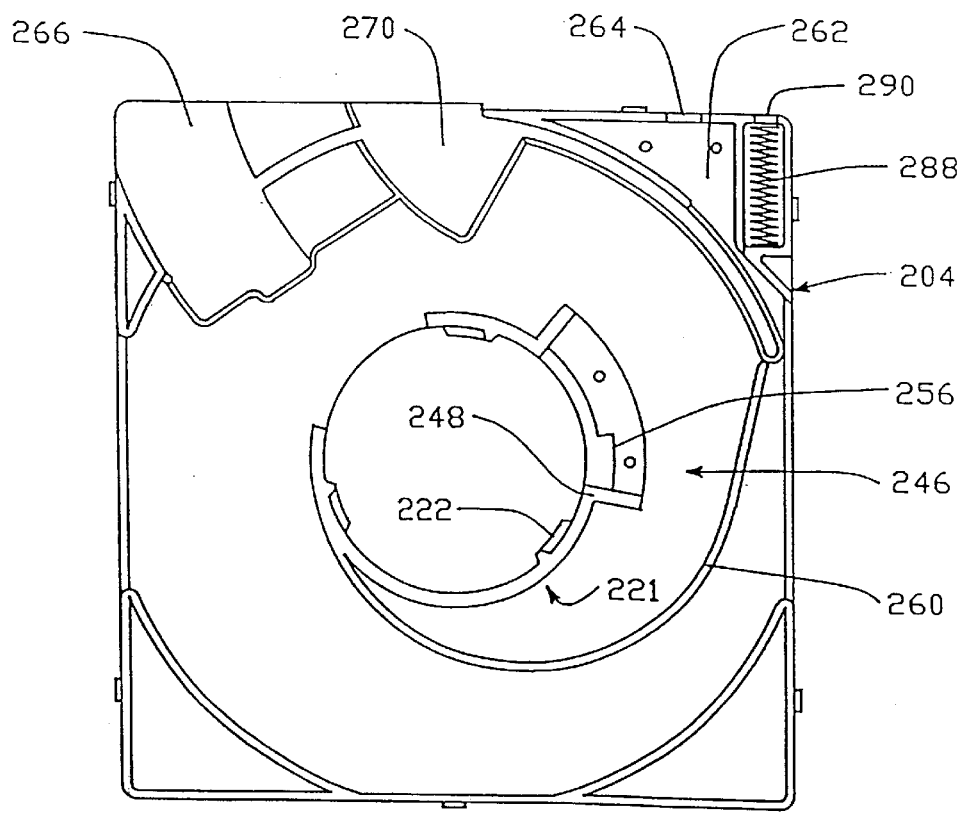
FIG.—14

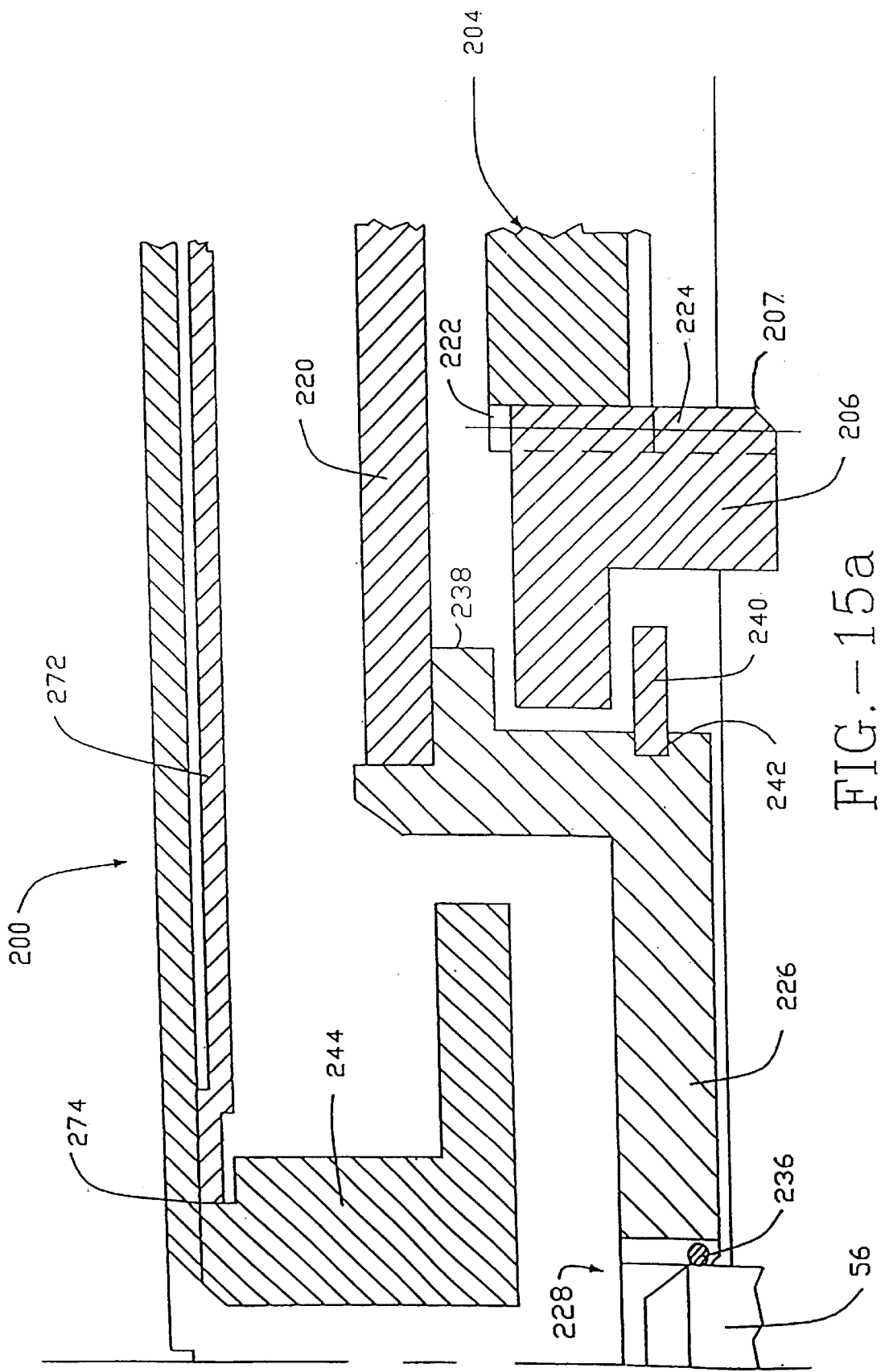

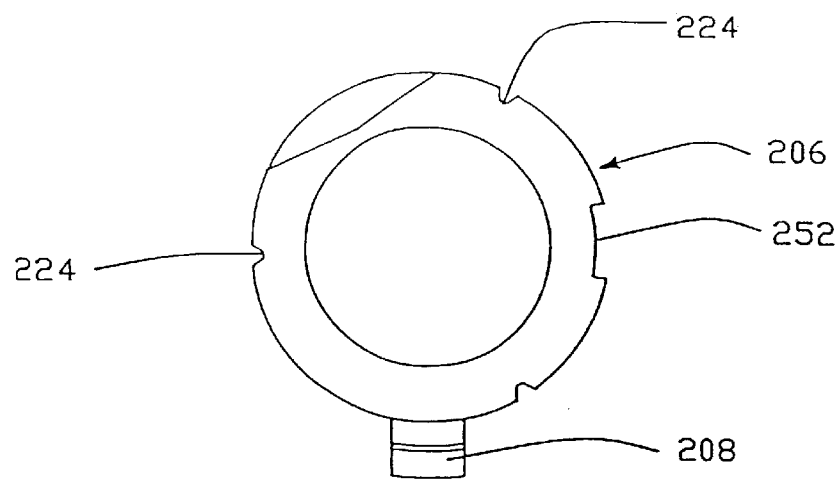
FIG.—16a
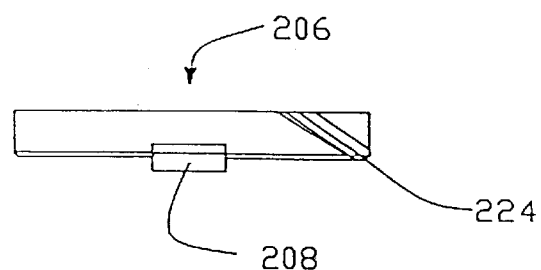
FIG.—16b
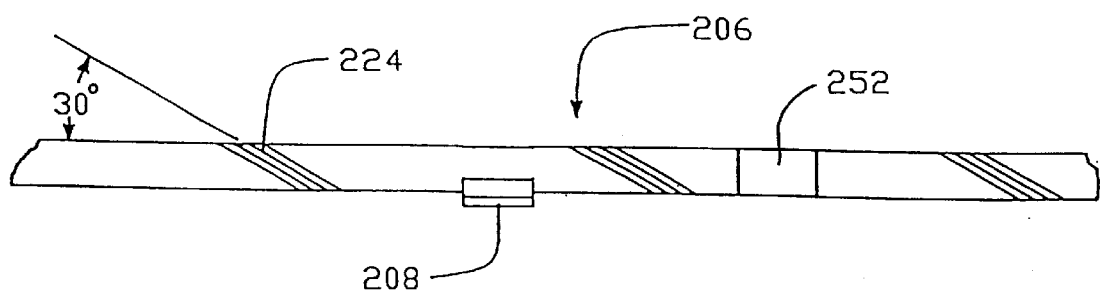
FIG.—16c

ROTATABLE DOOR AND DOOR OPENING MECHANISM FOR A CARTRIDGE

This application is a continuation of application Ser. No. 08/357,856 filed Dec. 15, 1994 now U.S. Pat. No. 5,831,790, which is a continuation of application Ser. No. 07/977,262 filed Nov. 13, 1992 now U.S. Pat. No. 5,440,436.

FIELD OF THE INVENTION

The present invention relates to disk drives and, in particular, disk drives where data is stored on hard disks.

BACKGROUND OF THE ART

The present assignee holds a number of patents describing removable cartridge disk drives and cartridges therefore. By way of example, these patents include U.S. Pat. No. 4,503,474 issued Mar. 5, 1985; U.S. Pat. No. 4,504,879 issued Mar. 12, 1985; U.S. Pat. No. 4,717,981 issued Jan. 5, 1988; U.S. Pat. No. 4,683,506 issued Jul. 28, 1987; U.S. Pat. No. 4,722,012 issued Jan. 26, 1988; U.S. Pat. No. 4,870,518 issued Sep. 26, 1989; U.S. Pat. No. 4,965,685 issued Oct. 23, 1990; and U.S. Pat. No. 4,864,452 issued Sep. 5, 1989. All of these references are incorporated herein by reference. These patents are directed to a removable cartridge disk drive which can receive a cartridge containing a hard disk upon which can be stored substantial amounts of data comparable, in some cases, to that stored on fixed disk drives.

In reviewing these patents, it is evident that design challenges reside in accurately receiving the cartridge into the disk drive cartridge receiver and settling the hub of the cartridge repeatedly and accurately onto the spindle shaft of a spindle motor. The spindle motor causes the disk contained in the cartridge to rotate at the appropriate operating speed. Design challenges also reside in the ability of the head and head arm assembly, located in the disk drive, to be positioned through a door in the cartridge in order to be loaded onto the disk contained in the cartridge for the read/write operations. Further, the design feature of reliably ejecting the cartridge from the disk drive once the read/write operations have been concluded is addressed.

A removable cartridge disk drive is highly useful for a number of reasons. The first reason is that a substantial amount of data can be stored on the cartridge, the cartride can be removed, and, if desired, conveniently shipped to another location. With the requirement to transport ever increasing amounts of data, as for example found in graphics files, the removable cartridge can store a substantial amount of data which would otherwise require a multitude of floppy disks. The data can thus be conveniently sent to, for a example, a publisher for publishing the graphics.

A second reason for such designs is that removable cartridge disk drives have an infinite capacity. Once a cartridge is filled with data, the cartridge can be replaced with a blank cartridge. Unlike with fixed drives, there is no need to trade up to a higher capacity disk drive or to purge lesser used documents from the hard disk drive.

A third reason is that if confidential or secret information is contained on the disk, the disk can be removed from the disk drive and secured in a safe location so that the data cannot be accessed by unauthorized individuals.

The trend in the computer market, and in particular the personal computer market, is to develop smaller, higher capacity and less expensive hardware. Thus, what used to be acceptable as far as performance and capacity in a desk top computer is now required for a notebook computer but at a substantially reduced size. Accordingly, there is a need to provide computer hardware, and for example, a removable cartridge disk drive and removable cartridge which is smaller, easier to manufacture, as for example, having fewer parts, and with higher data capacity.

SUMMARY OF THE INVENTION

The present invention is directed to providing a removable cartridge disk drive having a smaller form factor, which can be produced more economically, as for example with fewer parts, and with a higher data capacity.

Accordingly, the present invention is directed to a removable cartridge disk drive and cartridge which has a form factor of 1.8 inches and smaller.

Within this form factor, cartridges containing 40, 60 and 80 megabytes and more of storage can be configured.

The invention includes a system of a disk drive and a removable cartridge which are designed in such a way in order to minimize the size of the disk drive and cartridge. Such advantages are achieved by, for example, limiting the number of parts, designing the parts to perform multiple functions and designing the drive and cartridge system such that spaces in the system perform multiple functions such that when the disk in the cartridge is accurately positioned on a spindle motor for access by a read/write head, there is no unwasted space other than the space required for clearances.

The invention further includes a disk drive which is slidable into a docking port for immediate connection to, for example, a notebook or laptop computer.

The invention includes a cartridge which has a disk which is movable within the cartridge in order to appropriately position the hub which mounts the disk onto a spindle motor and also to appropriately position the disk so that the disk can be accessed by a read/write heads of the disk drive.

The invention further includes the ability to move the disk into clearance space in the cartridge preparatory to positioning the hub of the cartridge onto a spindle motor and then positioning the disk out of the clearance space and the appropriate distance between the walls of the cartridge for allowing the spindle motor to spin the disk at operating speeds.

The invention includes the cartridge having a hub which is extendable past the envelope of the cartridge in order to allow the disk to be positioned within the cartridge.

The invention includes a disk drive operating handle which performs multiple functions in order to allow a cartridge to be received and registered in a disk drive, allow the read/write heads of the disk drive to access the disk in the cartridge and allow the cartridge to be ejected from the disk drive. Such a multiple function handle provides for a compact design which can be provided on a 1.8 inch form factor.

The invention includes a head arm ramp of the disk drive which allows the position of the head to be accurately controlled and allows the head arm to be efficiently, smoothly and dynamically loaded onto the spinning disk as well as allows the head to be removed from the spinning disk.

The invention includes a disk drive cover which is easy and convenient to assemble to the drive base.

The invention further includes the cartridge having one or more projections extended therefrom for operating with the disk drive in order to register the cartridge with respect to the disk drive and to position the disk contained in the cartridge so that the disk can be properly accessed by the read/write heads of the drive.

The invention includes a cartridge design which protects the projections on the cartridge which are used to interface the cartridge with the disk drive. In keeping with the space reduction criteria of the design, these projections perform additional functions such as (1) ensuring that the cartridge is correctly inserted into the drive, and (2) operating the multifunction handle of the drive.

As part of the innovative cartridge registration design, the screw nut of the cartridge is accurately and repeatedly positioned both axially and radially with respect to a receiver in the disk drive to accurately position the cartridge in the drive.

Additionally, the cartridge includes a device for preventing the disk from rattling when the cartridge is removed from the disk drive.

A further invention of the cartridge includes the cartridge door and the door opening mechanism.

In addition to the reasons for having a disk drive with a reduced form factor as specified above, is the fact that with a 1.8 inch form factor cartridge, a single project can be assigned to a single cartridge and thus multiple projects can conveniently be stored and transported on multiple cartridges. This allows greater flexibility for use of such drivers with notebook computers.

Other important inventions, features and objects of the disk drive and removable cartridge are described herein and in the claims and figures. It is to be understood that the invention is multifaceted and that there is no requirement that the various aspects of the invention described hereinabove and herein throughout be associated with each other, for the advantages of the invention to be gained. Thus, there is no requirement that any particular grouping of the above aspects of the invention be made.

BRIEF DESCRIPTION OF THE FIGURES

FIG. 1 depicts a perspective view of an embodiment of the disk drive of the invention.

FIGS. 2a and 2b depict plan and side views of an embodiment of the disk cover of the invention of FIG. 1.

FIGS. 3a, 3b, 3c and 3d depict an embodiment of the disk drive of the invention of FIG. 1 with disk drive in non-operational, intermediate and operational modes.

FIGS. 4a, 4b, 4c and 4d depict an embodiment of the multifunction operating handle of the disk drive of the invention of FIG. 1.

FIG. 5 depicts an embodiment of the baseplate of the invention of FIG. 1.

FIGS. 6a, 6b, 6c and 6d depict an embodiment of the ramp of the invention of FIG. 1 with the head arm assembly and head positioned relative to the ramp in FIGS. 6c and 6d.

FIG. 7 depicts a cross-sectional view through FIG. 8, showing the cartridge mounted on the spindle motor of the embodiment of FIG. 1.

FIG. 9 depicts a top perspective view of the cartridge of the invention.

FIG. 10 depicts a bottom perspective view of the cartridge of the invention.

FIGS. 11a and 11b depict an embodiment of the cartridge of the invention of FIG. 9 with the cover removed to reveal the door and link mechanisms of other inventive features.

FIG. 12a depicts a bottom view of the cartridge of the invention of FIG. 9.

FIG. 12b depicts the cartridge screw and cartridge nut of the embodiment of the invention shown in FIGS. 9 and 12a.

FIG. 13a depicts a front edge view of an embodiment of the cartridge of the invention of FIG. 9.

FIG. 13b depicts a side edge view of the embodiment of the cartridge of the invention of FIG. 9.

FIG. 14 depicts the inside of the bottom of the cartridge of the invention of FIG. 9, showing the location of the cartridge nut of FIG. 12b.

FIGS. 15a, 15b and 15c depict cross-sectional views of the cartridge of FIG. 9, revealing specifically the cartridge screw, cartridge nut, the cartridge bottom and the disk in operation, non-operation and intermediate positions.

FIGS. 16a, 16b and 16c depict views of the cartridge screw of the embodiment of the invention of FIG. 9. FIG. 16c depicts the entire peripheral edge of the screw as shown in FIG. 16a which edge has been placed on a flat surface.

FIGS. 17a, 17b and 17c depict the inventive interaction between the embodiment of the cartridge screw of the embodiment of FIG. 9 and the embodiment of the disk drive handle of the disk drive embodiment of FIG. 1.

DETAILED DESCRIPTION OF THE PREFERRED EMBODIMENT

Figure 3A:
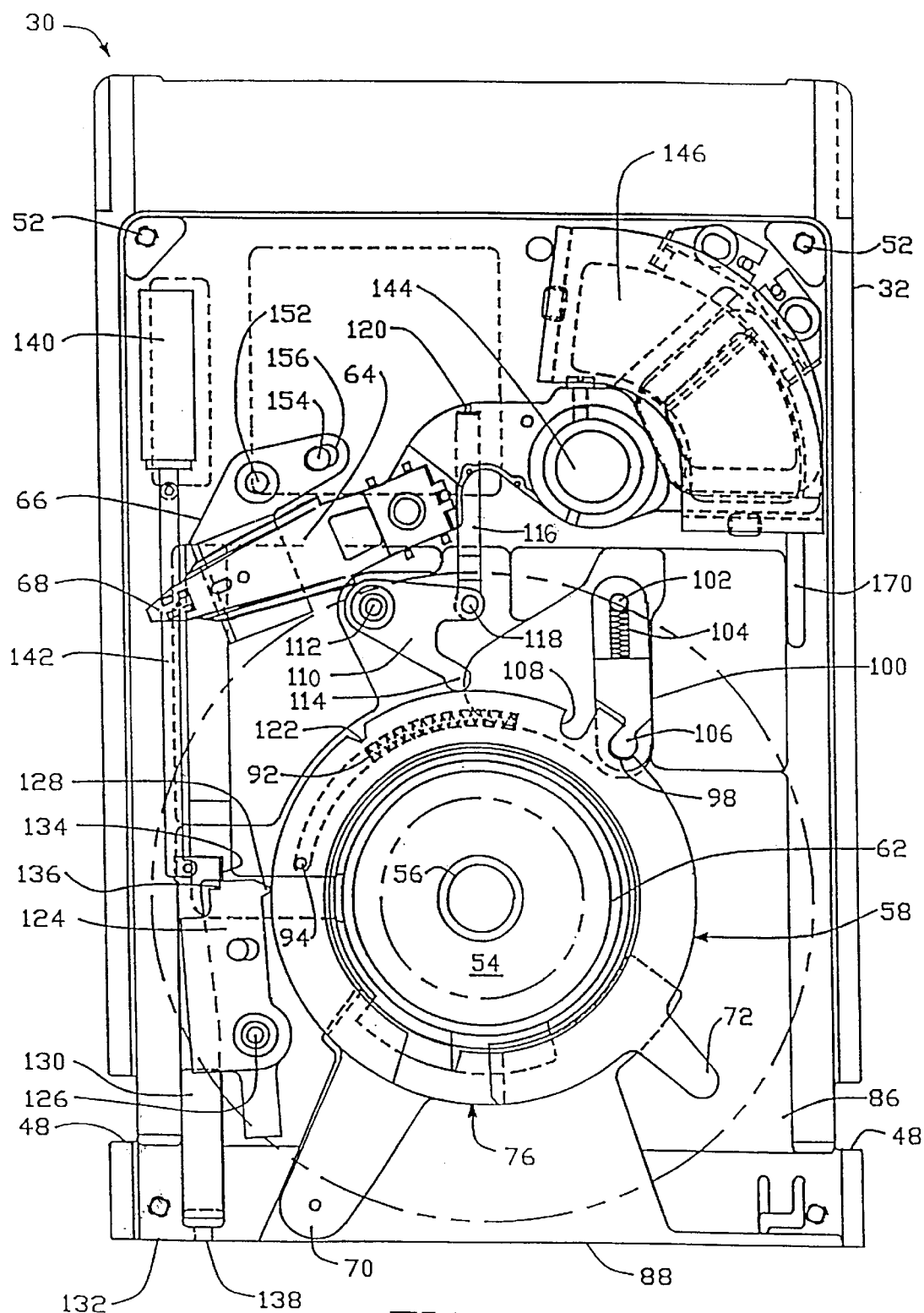

Removable Cartridge and Cartridge Housing:

It is to be understood that in a preferred embodiment, that the height of the disk drive 30 is 10.5 millimeters and that the disk drive is configured to take a cartridge with a disk having a diameter of approximately 1.8 inches. In a specific embodiment, the diameter of the disk is about 1.890 inches. By way of comparison, the cartridge 200 of the invention as shown in FIG. 9 has a width across the front side of the cartridge where the door is located of approximately 1.968 inches (49.98 millimeters) and a length or depth of 2.03 inches (51.56 millimeters). The height or thickness of the cartridge is 0.222 inches (5.64 millimeters).

The removable cartridge 200 of the invention (FIG. 9) includes a top cover 202 which is mated to a base 204 (FIG. 10). The top cover can be made of molded engineering plastic or metal and can be secured to the base using snap fits 207, adhesive bonding or by screws. The base 204 can be comprised of, for example, a molded engineering plastic.

Viewing FIG. 10, it is evident that mounted through the base is a cartridge screw 206 with a tang 208 projecting therefrom. Base 204 includes a substantially planar surface 210 with first and second projections 212, 214 extending therefrom. The tang 208 also extends away from the planar surface 210. Surrounding the tang 208 and the first and second projections 212, 214, and protecting same from damage, is a peripheral rail 216. As shown in FIG. 10, the peripheral rail 216 extends above the planar surface 210 and about three of the four peripheral edges of the base 204. The one peripheral edge 218 from which the peripheral rail does not extend is the leading side 218 of the cartridge (FIG. 13a) which defines a cartridge port through which the heads can be projected in order to access the hard disk 220 contained in the cartridge 200. As will be explained more fully hereinbelow, the cartridge screw 206 includes, in a preferred embodiment, three screw threads 224 (embodied as grooves in this configuration) which mate with cartridge nut threads 222 which are defined in the cartridge base 204 (FIGS. 12b, 14). Thus movement of the tang 208 causes the cartridge screw 206 to move relative to the cartridge nut 221 of cartridge base 204.

Mounted in the center of the cartridge screw 206 is the cartridge hub 226 onto which is mounted the disk 220 (FIG. 15a). The cartridge hub 226 includes a spindle nose engagement mechanism 228 which is used to accurately and repeatedly cause the hub 226 to be engaged and positioned on the spindle nose 56 of the spindle motor 54. The spindle motor engagement mechanism 228 includes, in a preferred embodiment, includes first and second contact points or bosses 230, 232. The engagement mechanism 228 further includes an elongated groove 234 within which is disposed a stiff spring locator 236. With spindle motor engagement mechanism 228 positioned over the spindle motor nose 56, the spring locator 236 is displaced causing the spindle motor nose 56 to be located by essentially three points defined by the two contact point 230, 232 and a point on the spring locator 236.

Cartridge Screw:

A more detailed view of the cartridge screw 206 can be seen in FIGS. 16a, 16b and 16c. In FIG. 16a a plan view of the cartridge screw 206 is depicted. It can be seen that the cartridge screw 206 includes screw threads 224. In a preferred embodiment, the screw threads 224 are specified as follows. The thread form is 60° stub as viewed normal to the pitch helix. The pitch angle is 30° with a left handed thread being specified. The pitch diameter is 0.733–0.000+0.003 with a lead of 1.330. The thread pitch is 0.065 normal to the pitch helix. Three equally spaced thread starts are provided. Reference is further called to the American Standard B1-3-1941. A similar mating thread is defined by a nut thread 222 in the base 204 (FIG. 10) of the cartridge housing.

As can be seen in FIG. 15a, the disk 220 is secured to the hub 226 by methods known in the art such as by use of appropriate adhesives and/or mechanical techniques. The cartridge screw 206 is retained between a flange 238 projecting from the hubs 226 and a retainer ring 240 which can be positioned in an annular groove 242 of the hub after positioning the cartridge screw 206 adjacent the flange 238. It is noted that there is substantial leeway between the flange 238 and the retainer 240 so that the cartridge screw 206 can alternatively urge against the flange 238 and retainer ring 240 in order to position the disk 220 in the cartridge 200 while also allowing the cartridge screw to be spaced from both the flange 238 and the retainer 240 during read/write operations as will be described hereinbelow. Also positioned in the cartridge 200 is a cartridge door pivot 274 and spacer 244.

In FIG. 15a, the cartridge hub is positioned engaging the spindle nose 56. This is the position that the hub 226 and disk 220 would occupy with the disk being rotated at an operating speed by the spindle motor and with the disk having the appropriate clearances between the cartridge top cover 202 and the cartridge base 204. In this configuration, the hub 226 is spaced an appropriate distance from the cartridge door pivot and spacer 244 with the cartridge screw 206 spaced between the flange 238 and the retainer 240 without touching either. As can be seen in FIGS. 7 and 15a, in the operational position, both the nut 206 and the hub 226 project below the plane of the planar surface 210 of the cartridge base 204.

Figure 15B:
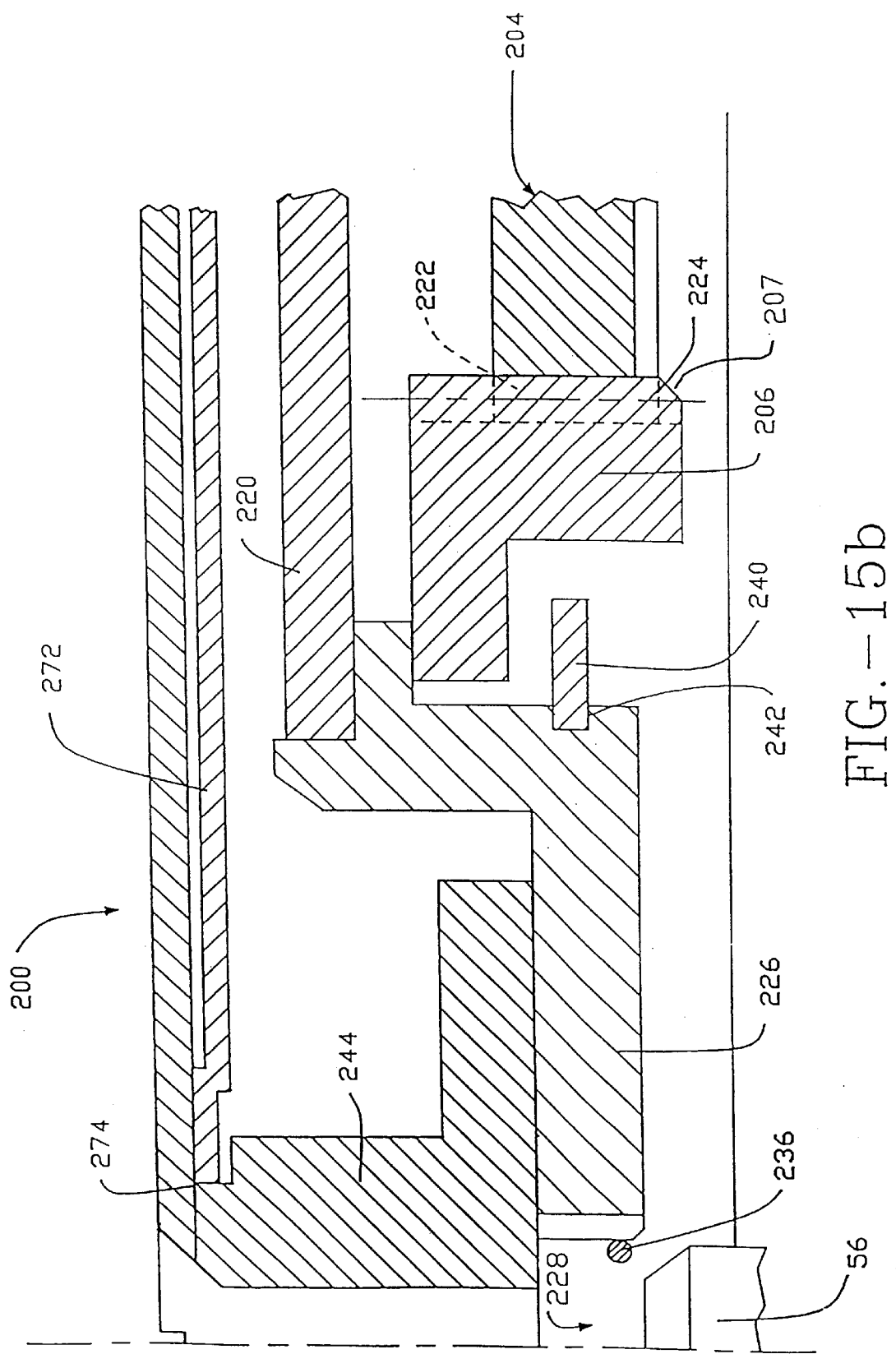

FIG. 15b depicts a cross-section as the cartridge would appear when the cartridge is external to disk drive. In this figure, it can be seen that the hub 226 is pushed up against the cartridge door pivot and spacer 244 by the cartridge screw 206 being urged against the flange 238 of the hub 226 pursuant to the urging of a spring 258 (FIG. 12b). This is an anti-rattle configuration of the hub and thus the disk is retained in a stationary position relative to the cartridge housing.

Figure 15C:
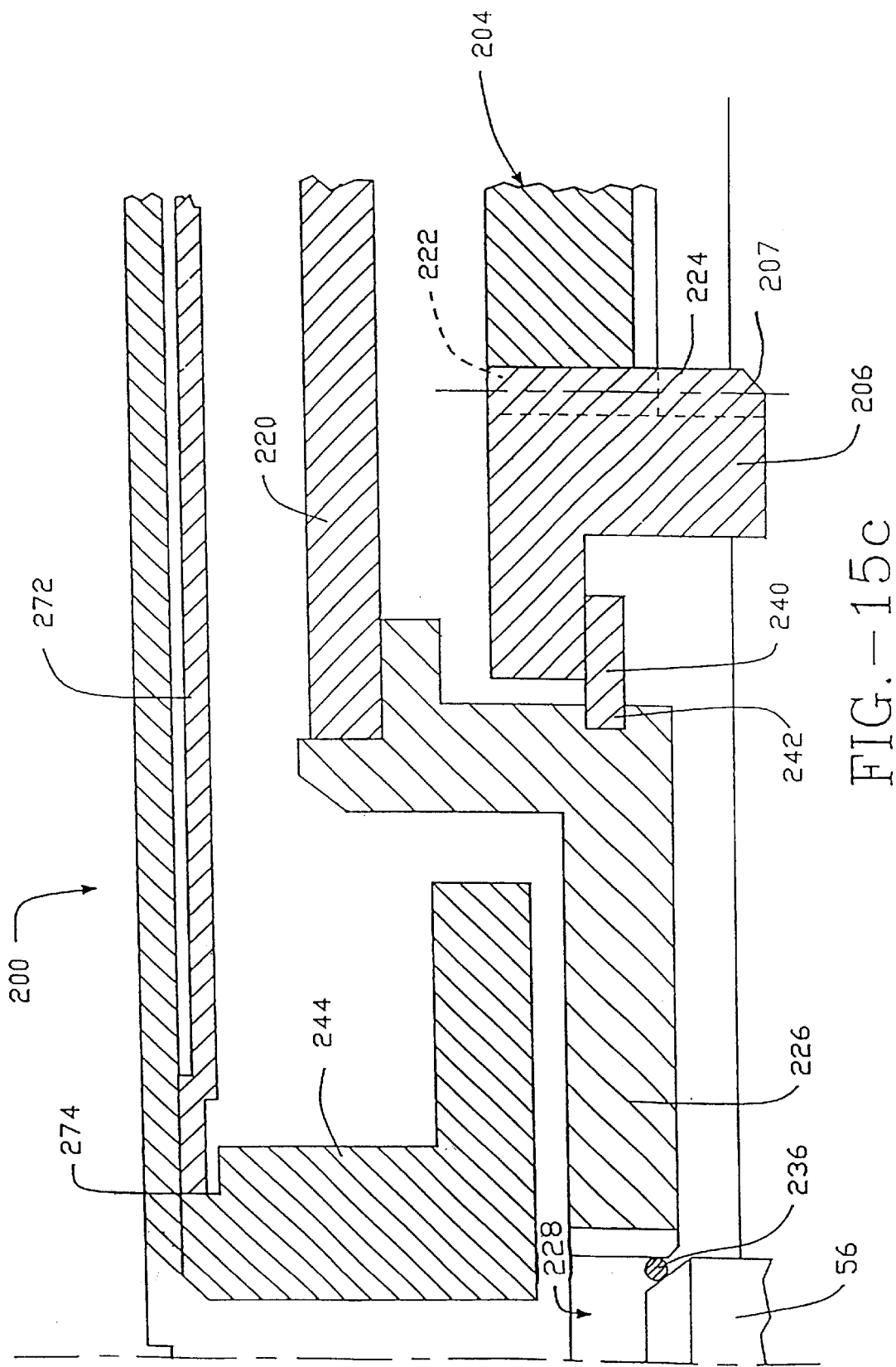

In FIG. 15c, the cartridge screw 206 is urging against the retainer 240 as the spindle nose engagement mechanism 228 begins to engage the spindle nose 56. As can be seen in FIG. 15c the spring locator 236 is just beginning to engage the spindle nose 56. The magnetic ring 57 on the spindle motor then proceeds to draw the hub 226 into contact with the spindle motor with the hub 226 fully seated on the spindle nose 56 as shown in FIGS. 7 and 15a.

Cartridge Base:

FIG. 14 depicts an inner surface 246 of the base 204 without any parts of the cartridge assembled thereto. As can be seen in FIG. 14, the base includes a central port 248 which defines the cartridge nut 221 and the nut threads 222. The nut threads 222 mate to the screw threads 224 of the cartridge screw 206. The cartridge screw 206 is held in position relative to the cartridge base 204 by a key 250 (FIG. 12b). Key 250 is positioned in a slot 252 of the cartridge screw 206. The key 250 includes a tab 254 which extends into a slot 256 defined by the cartridge base 204. The tab 254 of the key 250 allows the key 250 and the cartridge screw 206 to have limited rotational movement with respect to the cartridge base 204 with the tab 254 moving from one end to the other of the slot 256. The key 250 is biased in the first position, shown in FIG. 12b, by a spring 258. In this first position, the tang 208 is in a position which is properly aligned for reception by the drive 30 as will be described hereinbelow. In order for the disk to be properly positioned within the cartridge, preparatory to bring the disk up to operating speed, the tang, as will be described hereinbelow, is moved approximately 13.5° in order to reposition the disk. The slot 256 is approximately 15° wide allowing for variations and backlash.

As can be seen in FIG. 14, an upstanding spiral wall 260 extends from the base 204 and spirals from the central port 248 to the side of the cartridge. The spiral wall 260 is used to move air toward the cartridge filter which is located in space 262 so that the air can be exhausted through port 264. Defined in the cartridge base 204 are recesses 266, 270. These recesses are used to accommodate the portion of the head arm assembly which mounts the head 68 as the cartridge is inserted into the disk drive and as the head arm assembly is being ramped down onto a spinning disk so that the head 68 can be loaded onto the disk 220.

Cartridge Door:

Turning to FIGS. 11a and 11b, the cartridge door 272 is depicted in an open position (FIG. 11a) and a closed position (FIG. 11b). Door 272 is pivotally mounted at pivot point 274 to the cartridge door pivot and spacer 244 as can be seen in FIG. 15a. Pivotally secured to the cartridge door 272 at pivot point 276 there is a door opener link 278. The door opener link 278 includes a first section 280 and a second section 282 which is angled with respect to the first section 280 and disposed to ride in a groove 284 defined by the cartridge base 204. At the end of the second section 282 is a downwardly dependent tab 286. A coil spring 288 is captured between the downwardly dependent tab 286 and the back of the groove 284. A finger 170 (FIG. 3a) from the disk drive is inserted through port 290 to urge the tab 286 against the spring 288, thereby urging the door opener link 278 rearwardly causing the door to pivot about pivot point 274 from the closed position of FIG. 11b to the open position of FIG. 11a. When finger 170 is removed from port 290, the spring 288 causes the tab 286 to move forward towards the leading side 218 of the cartridge urging the door 272 to pivot to the closed position of FIG. 11b.

Figure 8:
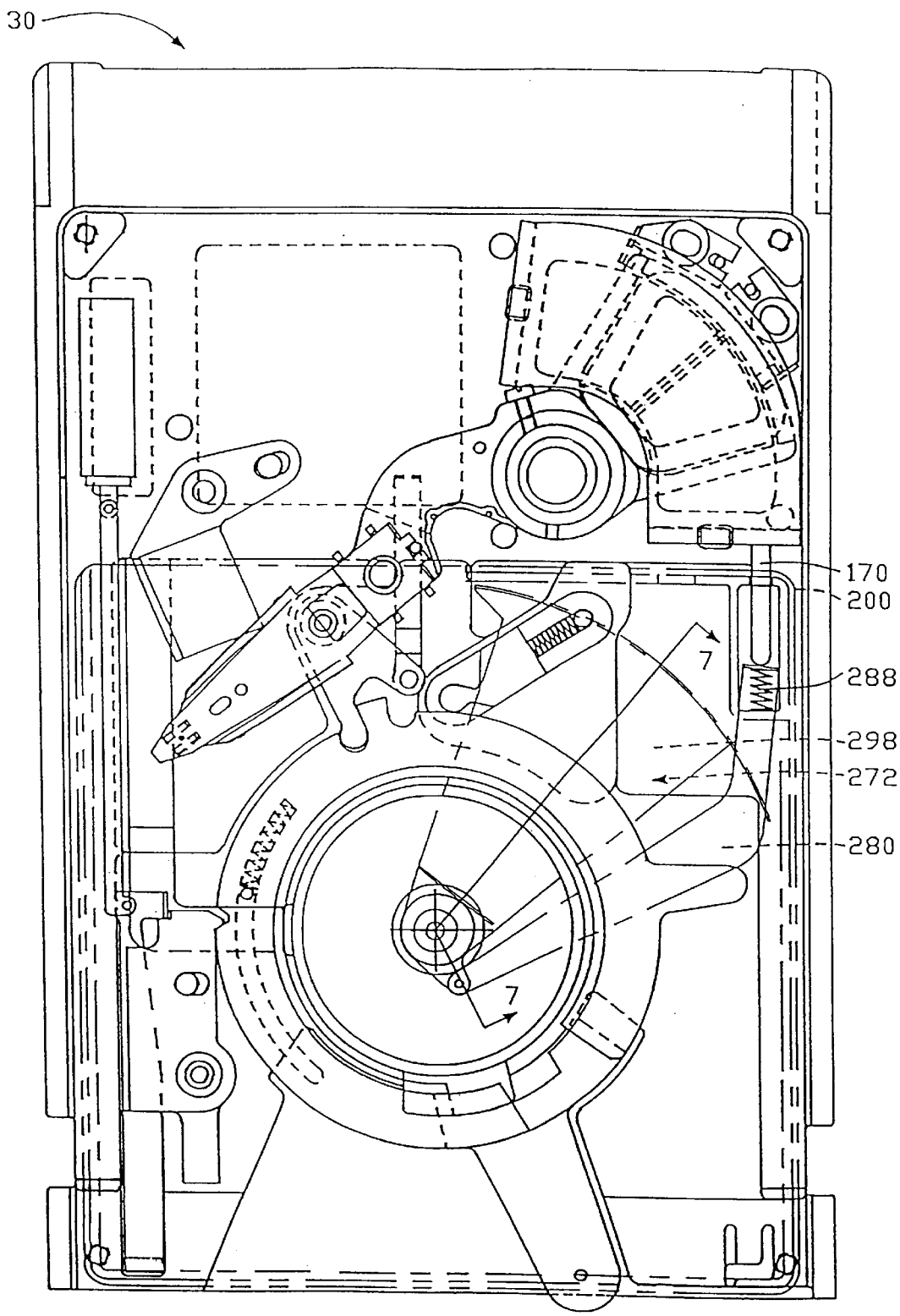
FIG. 8 depicts a cartridge of the invention received in the embodiment of the disk drive of the invention of FIG. 1 with the cartridge door fully opened.

FIG. 8 depicts an outline of an cartridge fully received within the drive. A finger 170 projects through the port in the cartridge in order to urge rearwardly the door opener link 278 thus causing the door to pivot to the open position as shown in FIG. 8. This action occurs on initial insertion of the cartridge into the drive as the heads even in a parked position (due to compactness of the drive) are immediately received within the enclosure of the cartridge even before they are unloaded onto the disk. FIG. 8 depicts the internal mechanisms of the drive in the same position as FIG. 3d.

The cartridge has been specially designed for the above functions and additionally has been designed so that it cannot be inadvertently inserted into the receiver of the disk drive in an improper orientation. By way of example only, handle 58 which extend up from the baseplate 32 of the disk drive, would hit against the rail 216 of the cartridge or the cover 202 of the cartridge (if the cartridge is upside down) if the rear side 292 or the lateral sides 294 296 were urged into the disk drive cartridge receiver instead of the leading side 218. Whether the cartridge is right side up or upside down if other than the leading side 218 is inserted into the cartridge receiver of the disk drive, the handle 58 would interfere with the passage of the cartridge and thus protect the heads. Further, should the leading side 218 be inserted first, but the cartridge be upside down, the cover 202 of the cartridge would prevent the cartridge from being fully received in the disk drive cartridge receiver as the cover would interfer with the handle 58. Only when the cartridge is properly inserted does the absence of a rail downwardly depending adjacent to leading side 218 allow the cartridge to clear the handle 58 so that the cartridge can be properly registered within the drive.

FIG. 7 is a cross-sectional view of the cartridge 200 located in the drive receiver 53. As can be seen in this figure and FIG. 11a, the cartridge door 272 is substantially "L" shaped in cross-section with a wedge shaped radial arm portion 298 from which a downwardly dependent arcuate side 300 extends. Side 300 is disposed in part in groove 302 defined in the cartridge base 204. Groove 302 defines a track for arcuate side 300. The door 272 seals the disk 220 from the outside by being disposed across the cartridge door port 205.

In FIG. 7 the retainer 62 is depicted with a chamfered head 63 and the cartridge screw 206 is also depicted with a chamfered or beveled edge 207. Chamfered edge 207 for the cartridge screw can additionally be seen in FIGS. 15a, 15b and 15c. These two chamfered edges come in sliding engagement with each other as the cartridge screw is being lowered toward the spindle motor by the handle 58. As this occurs, the cartridge screw is accurately positioned both axially and radially with respect to the retainer 62 as can be seen in FIG. 7 in the final resting position. The chamfered edges 62, 207 cause the cartridge screw 206 to be initially engaged and properly centered with the retainer 62 as the cartridge screw 206 is being urged down toward the retainer 62 by the handle 58. A distinct advantage of this arrangement is that as the cartridge screw is engaged in a thread of the nut of the cartridge base 204, the cartridge base 204 is in effect rigidly positioned with respect to the cartridge screw 206. Thus, with the cartridge screw 206 both axially and radially positioned by the retainer 62, the cartridge itself is accurately positioned with respect to the retainer 62 and the cartridge receiver of the disk drive. This provides an inventive apparatus and method of registering the cartridge with respect to the disk drive so that the heads can be accurately unloaded.

Disk Drive and Disk Drive Housing:

Referring to the figures and, in particular, to FIG. 1, an embodiment of the removable cartridge disk drive of the invention is depicted and identified by the numeral 30. The disk drive 30 includes a disk drive base 32, which in a preferred embodiment, can be cast from aluminum or other suitable material. The base cover 34 is secured onto the base 32. The base 32 defines base rails 36, 38 which can be used to cause the drive 30 to be slidably received into a PC MCIA interface such that the disk drive is slidable into and out of use with appropriate notebook, laptop or palmtop computers. The disk drive includes appropriate docking connectors 40 which communicate power, data, addresses and other signals between the disk drive 30 and the microprocessor or other computing means which requires data to be stored on the disk drive 30. The disk drive 30 includes a spring biased door 88 which is pivotally mounted to base 32.

FIGS. 2a and 2b depict the plan and side view of the base cover 34 of the invention which provide for ease of connection of the cover to the base and to limit the space required. The cover includes "J" shaped fingers 42 projecting from the sides 44 of the cover 34 adjacent to front end 46 of the cover. Through the upper surface of the rear portion of the cover are disposed bores 48 through which screws can be provided in order to secure the disk drive cover 34 to the base 32. In practice, the "J" shaped fingers 42 are positioned in the disk drive base openings 48 defined in the base 32 and locked under the base 32, with screws positioned through bores 48 received in the threaded bores 52 (FIG. 3a) defined in the base 32. Such an arrangement can conveniently hold the disk drive onto the base while minimizing the number and size of fasteners required.

Disk Drive Multifunction Handle Arrangement:

FIGS. 3a, 3b, 3c and 3d depict an embodiment of the disk drive of the invention of FIG. 1 with the disk cover 34 removed to reveal the internal operating mechanisms of the invention. FIG. 3a depicts the disk drive 30 preparatory to the insertion of cartridge 200 into the disk drive. FIG. 3b depicts the position on the mechanisms with the cartridge registered and the cartridge hub not as yet unloaded onto the spindle motor of the disk drive. FIG. 3c depicts the position of the mechanism of the drive with the cartridge hub engaging the nose of the spindle motor. FIG. 3d depicts the internal mechanism with the heads unloaded onto the disk contained in the cartridge.

Describing the internal mechanisms of the disk drive in greater detail, FIG. 3a depicts a spindle motor 54 which, in a preferred embodiment, is affixed to the base 32 and stationary with respect to said base 32. The spindle motor 54 includes a spindle motor shaft or nose 56.

Positioned about the spindle motor 54 is the multifunction handle 58. The multifunction handle 58 is shown by itself in FIGS. 4a through 4d. This multifunction handle 58 includes a central opening 60 which is retained by a handle retainer 62 so that the handle 58 can be pivoted about the spindle motor 54 during the operation of seating the cartridge 200 onto the spindle nose 56, and unlocking the head arm assembly so that it can be unloaded down ramp 66 with the head or transducer 68 unloaded onto the spinning disk 220.

The multifunction handle 58 includes an operator lever 70 and a cartridge engaging lever 72. Cartridge engaging lever 72 can be engaged by the first and second projections 212, 214 which are downwardly depending from the cartridge base 204 as will be described more fully hereinbelow. The multifunction handle 58 includes a central annular body 74.

Defined in the annular body 74, adjacent the operator lever 70, is cartridge tang engagement mechanism 76. This mechanism 76 includes a passageway 78 for initially receiving the tang 208 of the cartridge 200. As is evident from FIG. 10, upon insertion of the cartridge into the drive, the tang 208 trails the spindle nose engagement mechanism 228 of the cartridge 200 so that when the spindle nose engagement mechanism 228 is essentially above the spindle nose 56, the tang 208 is disposed in passageway 78 of the cartridge tang engagement mechanism 76 as can be seen represented schematically in FIG. 17a.

Figure 18:
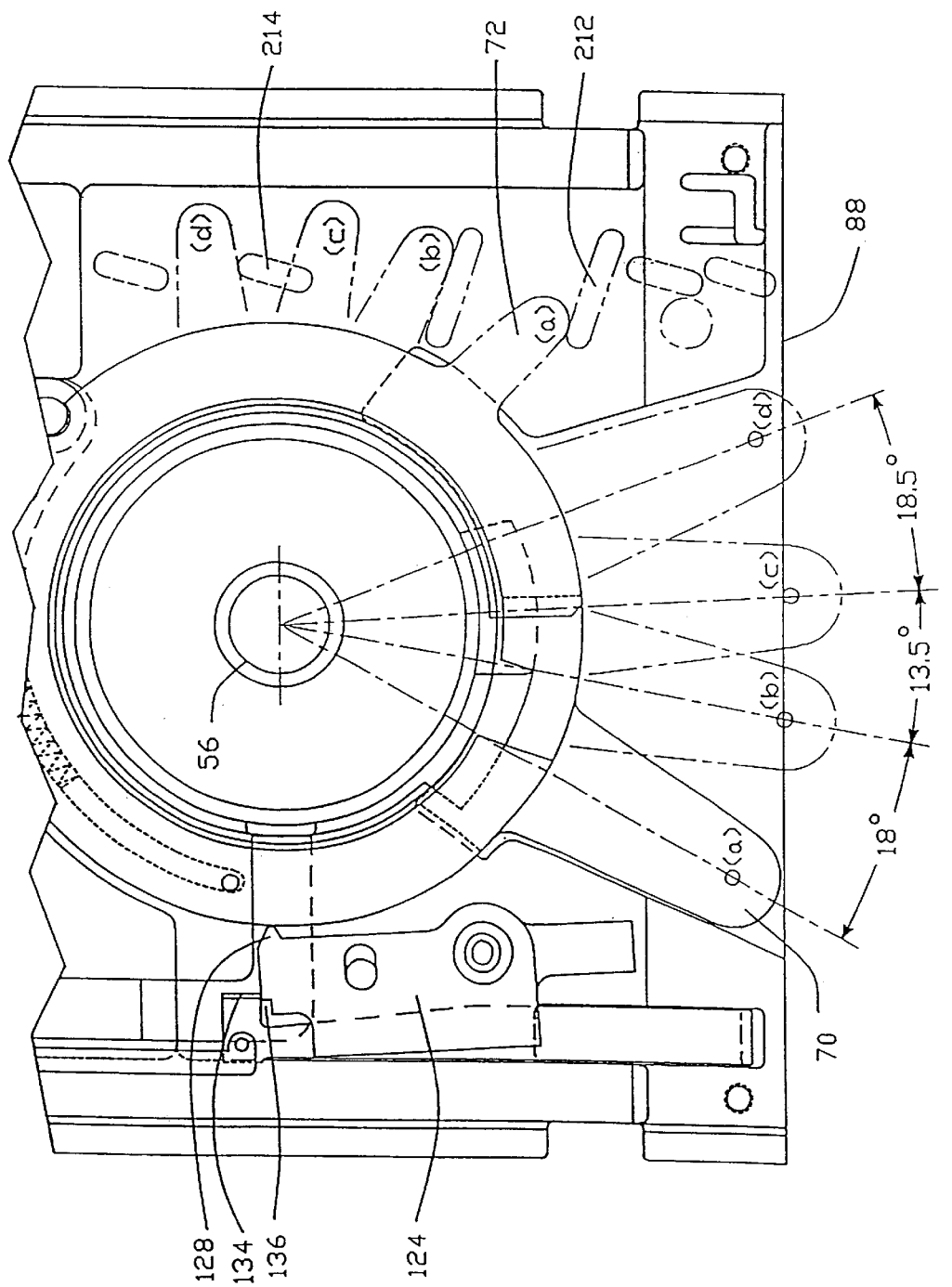
FIGS. 18, 18a, 18b, 18c and 18d depict the inventive interactions of the embodiment of the disk drive handle of the invention in FIG. 1 with an embodiment of the cartridge of the invention of FIG. 9.
Figure 18A:
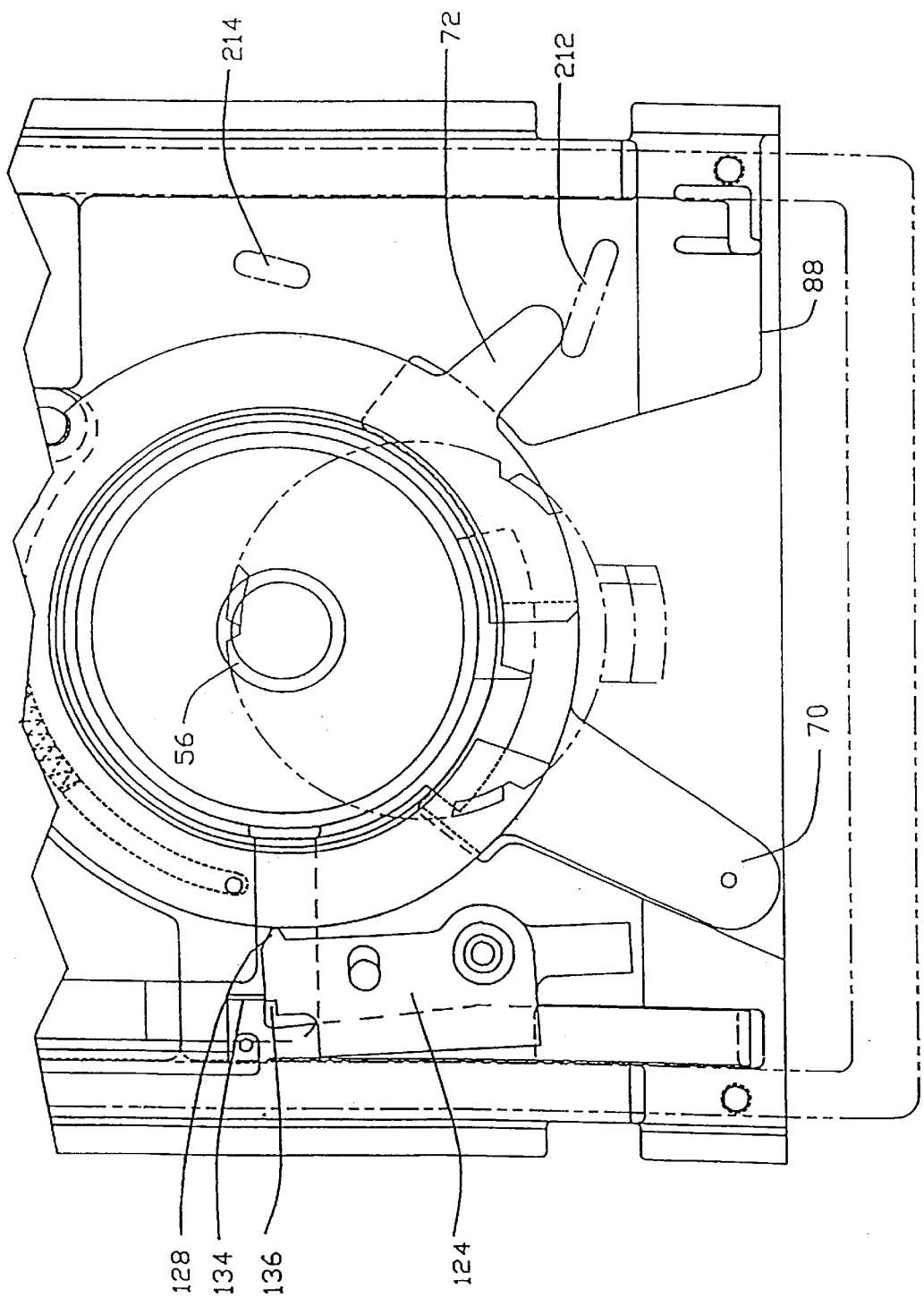

The cartridge tang engagement mechanism 76 further includes a cartridge seating tab 80 and a cartridge unseating tab 82. Immediately below the cartridge seating tab 80 is a groove 84 which can receive the tang 208 as described hereinbelow. Inserting the cartridge fully into the drive, causes the cartridge engaging lever 72 to be engaged by the first cartridge projection 212 which, in a preferred embodiment, is essentially parallel to a radius of the disk 220 (FIG. 18a). Thus, insertion of the cartridge 200 into the cartridge receiver 86 through the disk drive door 88 causes the operator level 70 to be rotated by the first projection 212 pushing against the cartridge engaging lever 72, in a preferred embodiment, approximately 18° to the position shown in FIGS. 3b and 18b. At this point the operator can easily access the operator lever 70 and as shown in FIG. 17a the tang 208 is engaged by the cartridge seating tab 80.

Figure 18B:
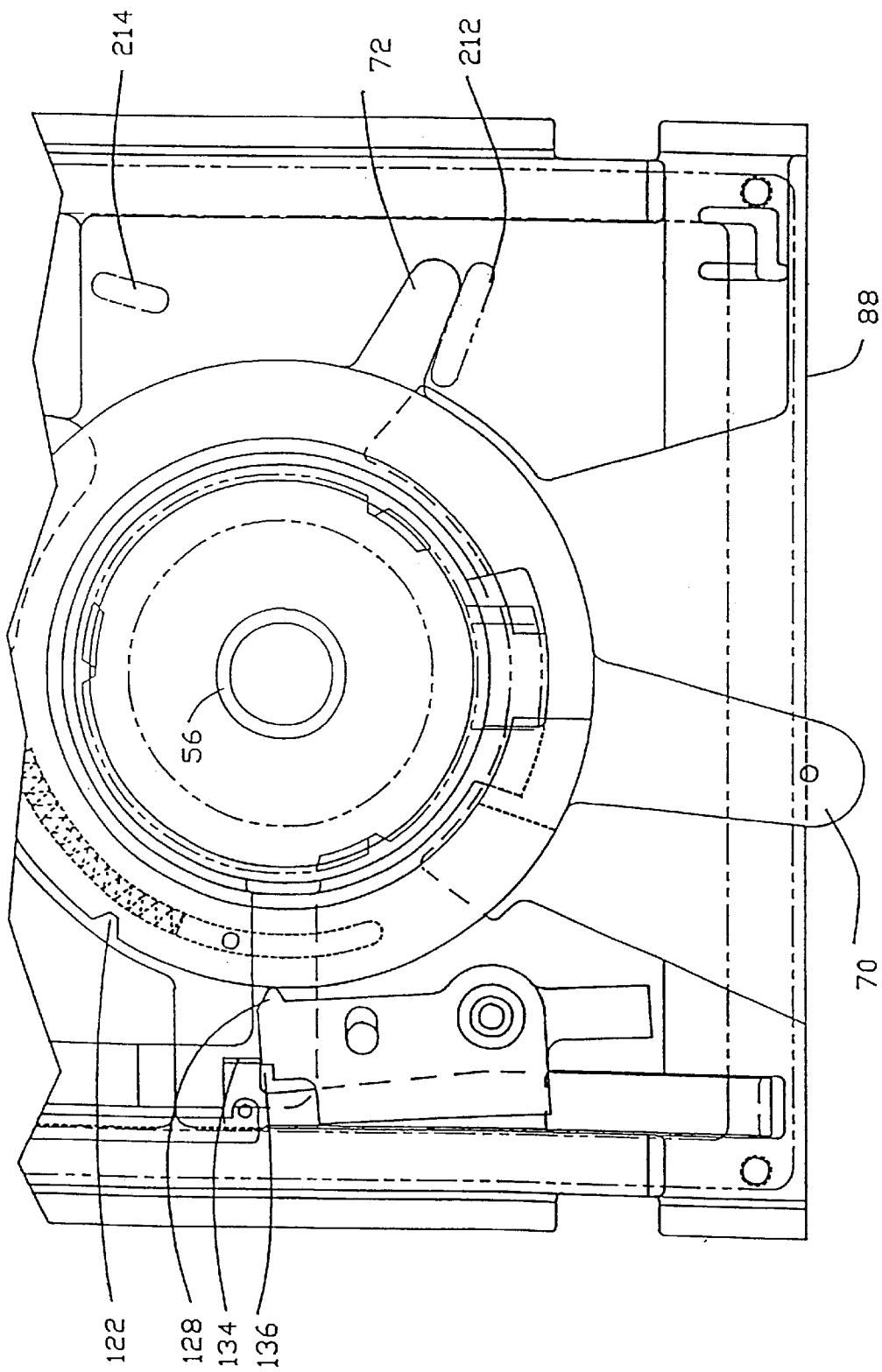
Figure 18C:
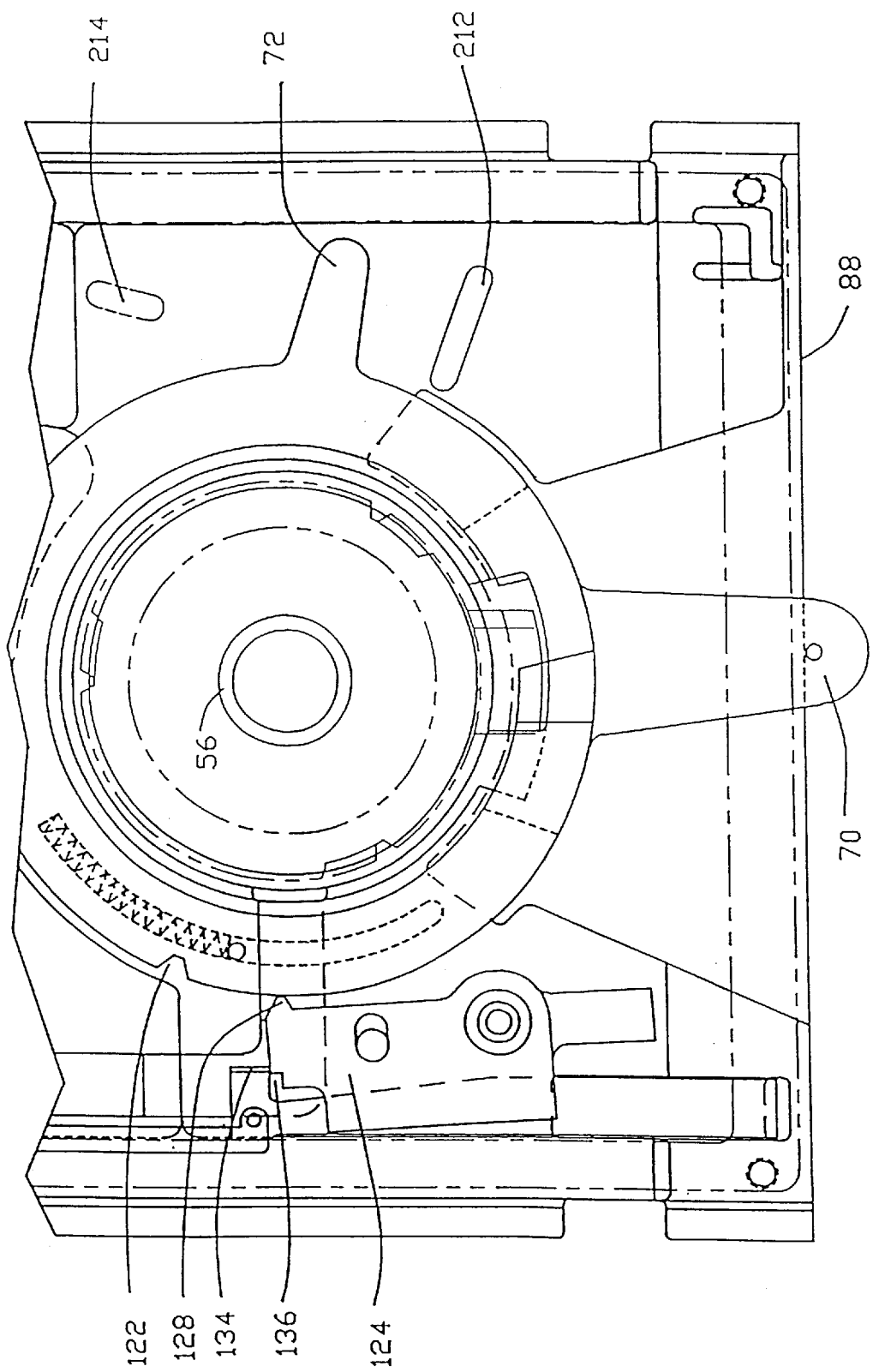
Figure 18D:
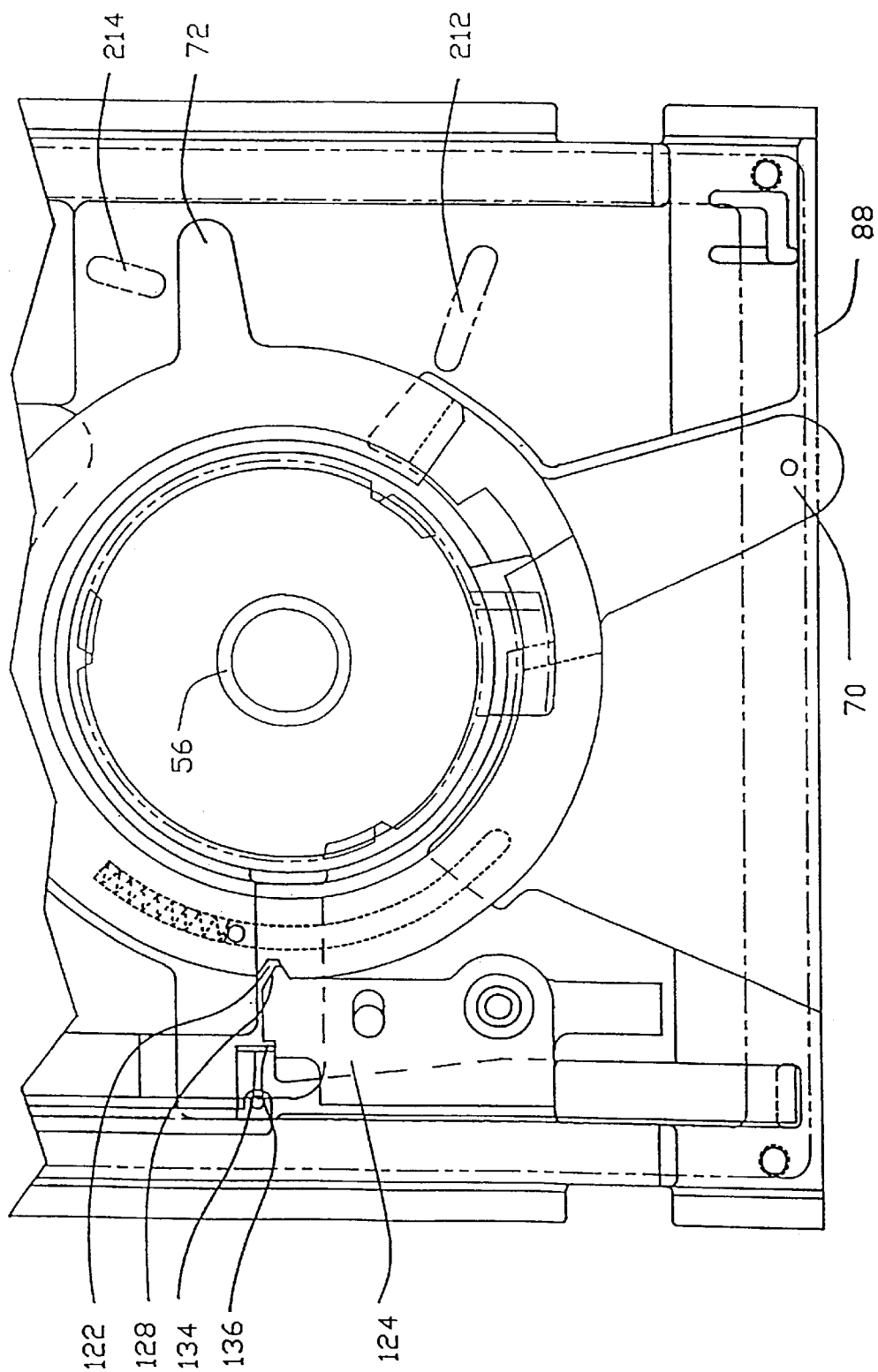

Once the operator lever 70 extends from the drive 30, the operator can urge the operator lever 70 to the position shown in FIGS. 3c and 18c which is approximately 13.5° from the position shown in FIGS. 3b and 18b for a total of approximately 31.5° from the non-operational cartridge unload position of the handle (FIGS. 3a and 18a). During the rotation of the operator lever 70, the incremental 13.5° from the position of FIGS. 3b and 18b to the position of FIGS. 3c and 18c, the disk and the hub of the cartridge are urged downwardly toward the spindle motor by the cartridge screw acting against the threads on the cartridge nut located in the cartridge base. As the hub approaches the spindle motor, the hub begins to engage the spindle nose, and the spindle magnetic ring 57 pulls the hub fully onto the nose in order to securely position the hub of the cartridge onto the spindle nose (FIG. 7). As can be seen in FIG. 17b, as this occurs, the tang 208 moves downwardly between tabs 80 and 82 to rest in the lower position as shown in FIG. 17b. At this point, the cartridge is fully seated onto the spindle motor. The operator lever 70 can then be urged by the operator up to an additional 18.5° (including 2° for backlash) to the fully closed position in order to allow the heads to be unloaded onto the disk as will be described hereinbelow. When this occurs, the tang 208 remains stationary and is locked into the groove 84 as the tab 80 passes over the tang 208. This overtravel allows for the multifunction handle 58 to perform a function of unlocking the head arm assembly 64 and other functions described below without effecting the position of the cartridge hub secured to the spindle motor and the disk in the cartridge. Thus during overtravel, the handle 58 moves to the final operational position shown in FIGS. 3d and 18d which, as will be described below, allows the head arm assembly to be released.

Prior to cartridge ejection, the cartridge unseating tab 82 is moved clockwise to apply force on the tang to unseat the hub from the spindle motor. This occurs as the operator lever is moved clockwise from the position of FIGS. 3c and 18c to the position of FIGS. 3b and 18b.

As can be determined by viewing FIGS. 18a, 18b, 18c and 18d, the insertion of the cartridge into the cartridge receiver causes the first projection 212, extending from the cartridge base 204, to engage the cartridge engaging lever 72 urging the lever to the position shown in FIG. 18b. It is noted that the second projection 214 slides past the cartridge engaging lever 72 with the operator lever in the non-operational, most leftward position as shown in FIGS. 3a and 18a. Upon cartridge ejection, the first cartridge projection 212 urges against the cartridge engaging lever 72 to eject the cartridge as the operator lever 72 is moved from the position of FIGS. 3b and 18b to the position of FIGS. 3a and 18a. As discussed elsewhere, if the operator lever 70 is not fully seated in the non-operational position of FIGS. 3a and 18a, then the second cartridge projection 214 which is, in a preferred embodiment, substantially perpendicular to the first cartridge projection 212, engages lever 72 to urge the operator lever 70 to the position of FIGS. 3a and 18a.

Disk Drive Handle Cartridge Election Function:

The multifunction handle 58 further performs a cartridge ejection function. The handle includes a groove 90 within which is disposed a spring 92 (FIGS. 3a, 3b, 3c and 3d). A pin 94 is upstanding from the base 32 of the disk drive 30 and is disposed in the groove 90. As the operator lever 70 is moved approximately 18.5° from the position of FIG. 3c and 18c to the position of FIGS. 3d and 18d wherein the handle 58 overrides the tang 208 of the cartridge screw 206, the spring 92 is compressed between the pin 94 and the end of the groove 90. The multifunction handle 58 is locked in this position by the latch 124 as will be discussed hereinbelow. When read/write operations have ceased, the latch 124 releases the handle 58 and the spring 92 causes the operator lever 70 to extend out of drive to the position shown in FIGS. 3c and 18c. At this point, the operator can urge the lever to the left to the position of FIGS. 3a and 18a. By so doing, this action unseats the hub of the cartridge from the spindle nose, and then the cartridge engaging lever 72 engages the first projection 212 which extends from the cartridge base in order to urge the cartridge out of the drive. Should the operator lever 70 not be fully pushed to the leftmost, non-operational position as shown in FIGS. 3a and 18a, the second projection 214 will come in contact with the cartridge engaging lever 72 to urge the handle 58 in a counter-clockwise motion insuring that the operator lever 70 is fully to the leftmost, non-operational position. So positioned, the operator lever is concealed in the drive so that it cannot be inadvertently actuated prior to a cartridge being inserted into the drive. Additionally the heads and head arm assembly loaded on the ramps are not damaged by being prematurely unloaded onto the cartridge receiver 86 without the cartridge received therein.

Handle Overcenter and Head Arm Assembly Lock Function:

The multifunction handle 58 performs a number of other functions. Engaging a groove 98 in a periphery of the multifunction handle 58 is an overcenter link 100 which pivots about pin 102 which is upstanding from the drive base 32. The overcenter link 100 defines a groove in which is loaded the pin 102 and a spring 104. As the multifunction handle is rotated in a counter-clockwise manner from the position of FIG. 3a to the position of FIG. 3c, a finger projection 106 of overcenter link 100 which is engaged in the groove 98 of the multifunction handle 58, is urged in a counter-clockwise manner from the position of FIG. 3a to the position of FIG. 3c. As this occurs, the spring 104 is compressed as the overcenter position is reached. The purpose of the overcenter link 100 is to lock the multifunction handle 58 in the non-operational position as shown in FIG. 3a and can also be used to assist in ejecting the cartridge 200 from the drive 30. It is to be understood that the cartridge can be ejected by the handle 58. However, in some embodiments, the overcenter link 100 can be used to urge against the handle to assist with the cartridge ejection. Inserting the cartridge 200 into the disk drive 30 and having the operator actuate the operator lever in a counter-clockwise motion overcomes the overcenter link 100 in order to unlock the multifunction handle 58. Adjacent to the groove 98 is a second groove 108 defined in the periphery of handle 58. A push link crank 110 is pivotally mounted to the disk drive base 32 at pivot point 112 such that the crank 110 can pivot from the position shown in FIG. 3a to the position shown in FIG. 3d thus pivoting in a clockwise manner as the multifunction handle 58 is urged in a counter-clockwise manner. The crank 110 includes a cam follower 114 which follows a peripheral edge of the handle 58 until it resides in the groove 108 as can be seen in FIG. 3d. This occurs at the end of the overtravel motion of the handle 58. As this occurs, an arm push link 116 which is pivotally secured at pivot point 118 to an extension of the crank 110 is moved toward the spindle motor 54, releasing the head arm assembly 64. In a preferred embodiment, a pin 120 extends downwardly from the head arm assembly 64 and is engaged by the arm push link 116. Causing the multifunction handle 58 to rotate in a clockwise direction causes the crank 110 to move in a counter-clockwise direction urging the link 116 against the pin 120 to cause the head arm assembly to be lifted off the disk 220 and urged up the ramp 66.

Handle Latch:

Preceding in a counter-clockwise manner about the handle 58 another groove 122 is defined in the periphery of the handle. This groove is designed to mate with the latch 124 in order to lock the handle in the operational position shown in FIGS. 3d and 18d with the cartridge fully received in the cartridge receiver, the cartridge hub mounted on the spindle motor nose, and the head arm assembly unlocked. The latch 124 pivots about pivot point 126 and a spring biases the latch toward the handle 58 so that it will be urged into groove 122 when groove 122 presents itself to the projection 128 from the latch 124. As this occurs, a spring biased interposer 130 is urged downwardly towards the door opening side 132 of the disk drive. A projection 134 on the interposer then falls into a slot 136 defined in the latch to retain the latch in a locked position. In an emergency situation with power removed from the disk drive, a small diameter wire can be inserted through a port 138 in the door opening side 132 of the disk drive 30 in order to urge the interposer to become disengaged from the latch, so that spring 92 contained in the handle 58 will urge the handle 58 to extend from the disk drive (FIGS. 3c and 18c) so that the operator can manually turn the operator lever clockwise from the position of FIGS. 3c and 18c to the position of FIGS. 3a and 18a in order to cause the cartridge to be ejected from the disk drive.

In normal operation, the latch 124 is disengaged from the groove 122 of the handle by use of the solenoid 140 which pulls up on the solenoid link 142 and which in turn pulls up on the interposer 130 to release the latch 124.

It is to be understood that alternatively, the latch 124 can be replaced with a solenoid which would have a plunger which would engage groove 122 of the handle. An appropriate emergency release mechanism which can be manually operated from the door opening side 132 would release the handle should power to the disk drive cease with a cartridge locked in the disk drive cartridge receiver.

Disk Drive Ramp:

In FIG. 3a, the head arm assembly 64 is pivotally mounted at pivot point 144 and is actuated by a voice coil motor 146. As previously indicated the head arm assembly 64 can be loaded onto the disk 220 from the ramp 66. As seen in FIGS. 6a through 6d, the ramp 66 is of an innovative design and includes upper and lower head arm landing surfaces 148, 150. The ramp 66 is secured to the base by appropriate fastening means at point 152 with a pin 154 upstanding from the base received in a slot 156 of the ramp. In a preferred embodiment, the arm loading surfaces 148, 150 terminate in a landing ridge 158, 160. In a preferred embodiment, the head arm loading surfaces 148, 150 slope downwardly from the ridges 158, 160 at approximately a 2.74° slope. The head arm assembly 64 includes an arm 164, a leafspring 166, a load beam 168 and a gimble mount 169 to which the read/write head 68 is mounted. As can be seen in FIG. 6c, a lower corner 162 of the head arm loading surface 148 is first to engage a portion of the load beam 168 of the head arm assembly 64. In the position with the head arm assembly fully received on the ramp 66, the load beam 168 is supported by the ridge 158 nearly adjacent to the gimble mount 169 and read/write head 68. The reason for this arrangement is that the ramp 66 needs to be able to remove the head from the disk at a point well before the portion of head arm assembly 64 adjacent the head can be picked up by the ramp 66. Thus, the ramp picks up a portion of the load beam 168 well removed from the head 68 as can be seen in FIG. 6c. It is further to be understood that due to the confined spacing, as the cartridge is received into the disk drive, that the cartridge door is opened and the heads, fully loaded on the ramp 66, are received in the cartridge. Accordingly, there is a need to exactly control the position of the heads so that they are not damaged by the cartridge as the cartridge is urged into the disk drive. Thus, as seen in FIG. 6d, the ramp 66 needs to accurately control the load beam 168 adjacent to the head. Once the disk is properly positioned within the cartridge due to the motion of the cartridge screw, the load beam can move down the arm loading surfaces 148, 150 so that the heads are loaded onto the spinning disk.

As can be seen in the present embodiment, the ramp 66 picks up and first engages the load beam 168 at a point which is distant from the location where the head is mounted and, in fact, as shown in FIG. 6c is adjacent to the leafspring 166. As the voice coil motor rotates the head arm assembly 64, the load beam 168 moves up the ramp such that the head 68 is positioned accurately by the ridge 158 of the ramp 66 which contacts the load beam 168 substantially adjacent to the location where the head is mounted. Thus, a substantial portion of the load beam is traversed by the ramp as the load beam moves relative to the ramp.

The disk drive and cartridge can be made of a number of materials as are known in the trade. Some of these materials are disclosed in the above prior art references. By way of example only, the cartridge cover can be made of aluminum with the bottom of the cartridge made of plastic such as polycarbonate. The base of the disk drive can be made of cast aluminum with the top made of formed aluminum. Other plastics which can be used for the parts in addition to polycarbonate and include Delrin®, Nylon® and the like. These parts can include graphite and nylon composites and other composites and in addition have Teflon® composites in order to increase lubricity.

Industrial Applicability:

The operation and further advantages of the invention are as follows. First it is evident from the above that the above design accomplishes a removable cartridge disk drive and removable cartridge that successfully fits within a 1.8 inch form factor wherein the disk is approximately 1.8 inches in diameter and the height of the drive is 10.5 millimeters. In this form factor, 40, 60 and 80 megabyte and greater capacity cartridges can be used. The ability of the drive to conform to the 1.8 inch form factor is attributable to a number of factors taken separately, which separate factors also offer additional advantages taken together. These factors include the fact that the disk drive and the removable cartridge act as a system, which minimize the number of parts and which has a highly inventive system interface for allowing the cartridge to be received, the disk to be properly positioned and the remaining functions of the disk drive to be carried out. In particular, in order to accomplish the 1.8 inch form factor, the cartridge has been designed so that the disk and the hub on which the disk is mounted can be relocated relative to the housing of the cartridge in order to have the hub clear the spindle motor and spindle motor nose as the cartridge is inserted into the cartridge receiving mechanism of the disk drive. This results in an efficiency of utilization of space so that after the hub is mounted on the spindle motor there is no unnecessary dead space above or below the cartridge that does not have a purpose. That is to say that the disk and the hub are movable in the normal clearance space required by the disk when it is spinning relative to the housing walls. Movable within this clearance space, the disk and hub can be engaged with the spindle motor nose and once this engagement has occurred, the disk is properly spaced between the upper and lower surfaces of the cartridge housing. In this configuration, the hub extends from the envelope of the cartridge housing. Such an arrangement accordingly does not require that the cartridge be moved in the drive in order to properly position the hub on the spindle motor or that the spindle motor be moved in order to engage the hub of the cartridge, both activities potentially creating wasted space once the drive is actually operating.

Further, with respect to the cartridge and disk drive interface, the cartridge has several projections extending therefrom which can engage the internal mechanisms of the disk drive in order to ensure proper operation of the disk drive once the cartridge is received into the cartridge receiving mechanism. This interface assists in limiting the number of moving parts required in the disk drive, allowing the parts to have multifunctions and assisting in accomplishing the 1.8 inch form factor design. By way of example, the cartridge screw includes a tang extending therefrom. The engagement of the tang with the multifunction handle of the disk drive causes the repositioning of the disk within the cartridge and assists in locking the tang and thus the cartridge to the disk drive during disk drive operation. Further, the cartridge projections assist in positioning the multifunction handle. The projections further provide a compact mechanism for allowing the cartridge to be ejected from the drive and also ensuring that the operator level in the full non-operational position once the cartridge has been removed from the drive. The cartridge includes a rail which protects the tang and projections from damage. This rail has an additional function of preventing the cartridge from being incorrectly inserted in the drive.

It is noted that there are other multifunction purpose of the cartridge screw and cartridge design. When the cartridge is removed from the disk drive and for example being transported, the hub is urged up against a spacer in order to place the disk in a stationary position relative to the housing so that there is no rattle of the disk in the cartridge. A spring mechanism within the cartridge urges the cartridge screw to the a position so that the hub butts up against the spacer to accomplishing the anti-rattle function. The spacer also provides a mount for pivotally mounting the cartridge door.

A further aspect which allows the disk drive to be compact, efficient and meet the 1.8 inch form factor and also smaller form factors is the design of the arm ramp which allows for the exact positioning of the heads so that as the cartridge is inserted into the drive, the ramp and heads simultaneously come within the envelope of the cartridge housing and prior to the cartridge hub being seated on the spindle motor. This arrangement allows the disk drive to be shorter in length, and also allows the heads, parked in a stationary position loaded on the ramps, to be positioned as close as possible to the disk. This allows, for example, for the head to be tangent with more of the tracks resulting in greater recording efficiencies.

Further the above design allows the entire disk drive to be slidable and dockable in a port provided on a notebook or other computing device.

The above compactness is in addition attributed to the multifunction handle located within the disk drive and adjacent to the cartridge receiving mechanism. The handle performs the functions of (1) engaging the cartridge and locking the cartridge in position, (2) positioning the hub and disk so that the hub engages the spindle motor nose and the disk is properly positioned within the cartridge, (3) ejecting the cartridge when desired, (4) releasing the head arms assembly so that they can be unloaded from the ramp onto the disk for read/write operations, (5) pivoting an overcenter link in order to lock the handle in the non-operational position and (6) allowing a mechanism to lock the handle in a fully operational position.

Even the disk drive cover affords compactness in design in that it has appropriate catches for engaging the base of the disk drive and only requires a minimal number of fasteners to secure to disk drive base.

In addition to the above, the cartridge further includes an internal spiral wall for assisting and directing air within the cartridge to exit the cartridge through a filter. The cartridge additionally has recesses formed in the internal surface of the housing in order to accommodate the heads and ramp prior to the heads being loaded onto the disk.

It is to be understood that other objects, aspects and inventive features can be obtained from a review of the figures and claims. Further, it is to be understood that embodiments other than those presented herein can be fabricated and come within the spirit and scope of the invention as described herein.

We claim:

1. A cartridge for use in a disk drive, the disk drive including a read/write head for reading and recording information and a finger for engaging the cartridge, the disk drive defining an opening permitting the cartridge to be inserted into the disk drive, the cartridge comprising:

a shell having a leading edge, a back edge, and two side edges, the leading edge defining a cartridge door port and a door control port, the door control port being proximal to a junction of the leading edge and one of the side edges, the shell defining a passage extending in a direction substantially parallel to the two side edges, a rotatable recording medium disposed in the shell;

a door mounted within the shell, the door being rotatable about a pivot point between a closed position and an open position, the door permitting the read/write head to access the recording medium when the door is in the open position and when the cartridge is inserted into the disk drive, the door blocking the cartridge door port when the door is in the closed position; and a door opening link having a first end and a second end, the first end being coupled to the door proximal to the pivot point, the second end being movable within the passage in a direction substantially parallel to the side edges between a closed location and an open location, the closed location being proximal to the door control port, the door being in the closed position when the second end of the door opening link is in the closed location, the door being in the open position when the second end of the door opening link is in the open location, the finger of the disk drive extending through the door control port into the passage and pushing the second end of the door opening link from the closed location to the open location as the cartridge is inserted into the disk drive.

2. A cartridge according to claim 1, the cartridge further including a spring disposed within the shell, the spring having a first end and a second end, the first end of the spring contacting the shell, the second end of the spring biasing the door towards the closed position.

3. A cartridge according to claim 2, the spring being disposed in the passage.

4. A cartridge according to claim 3, the second end of the spring contacting the second end of the door opening link.

5. A cartridge according to claim 1, the door including a radial arm portion and an arcuate side.

6. A cartridge according to claim 5, the arcuate side extending downwardly from the radial arm portion.

7. A cartridge according to claim 6, wherein a cross section of the door is L shaped.

8. A cartridge according to claim 5, the cartridge defining a groove, a portion of the arcuate side being disposed in the groove.

9. A cartridge according to claim 5, wherein the radial arm portion is wedge shaped.

10. A cartridge according to claim 1, wherein the door opening link includes a door section and a passage section, the first end being at an end of the door section, the second end being at an end of the passage section.

11. A cartridge according to claim 10, the door section being angled with respect to the passage section.

12. A cartridge according to claim 10, the passage section including a tab at the passage end and a horizontal portion, the tab extending downwardly from the horizontal portion.

13. A cartridge for use in a disk drive, the cartridge comprising:

a shell having a leading edge, a back edge, and two side edges, the leading edge defining a cartridge door port and a door control port, the door control port being proximal to a junction of the leading edge and one of the side edges, the shell defining a passage extending in a direction substantially parallel to the two side edges, an end of the passage being adjacent to the door control port;

a rotatable recording medium disposed in the shell;

a door mounted within the shell, the door being rotatable about a pivot point between a closed position and an open position, the door covering at least a first portion of the cartridge door port when the door is in the closed position, the door not covering the first portion of the cartridge door port when the door is in the open position; and a door opening link having a door section and a passage section, the door section defining a first end of the door opening link, the passage section defining a second end of the door opening link, the door section being angled with respect to the passage section, the first end of the door opening link being coupled to the door proximal to the pivot point, the second end of the door opening link being translatable within the passage between a port position and a retracted position, the port position being proximal to the door control port, the door being in the closed position when the second end of the door opening link is in the port position, the door being in the open position when the second end of the door opening link is in the retracted position.

14. A cartridge according to claim 13, the cartridge further including a spring disposed within the shell, the spring having a first end and a second end, the first end of the spring contacting the shell, the second end of the spring biasing the door towards the dosed position.

15. A cartridge according to claim 14, the spring being disposed in the passage.

16. A cartridge according to claim 15, the spring contacting the passage end of the door opening link.

17. A cartridge according to claim 13, the door including a radial arm portion and an arcuate side.

18. A cartridge according to claim 17, the arcuate side extending downwardly from the radial arm portion.

19. A cartridge according to claim 18, wherein a cross section of the door is L shaped.

20. A cartridge according to claim 17, the cartridge defining a groove, a portion of the arcuate side being disposed in the groove.

21. A cartridge according to claim 17, wherein the radial arm portion is wedge shaped.

22. A cartridge according to claim 13, the passage section including a tab at the passage end and a horizontal portion, the tab extending downwardly from the horizontal portion.

23. A cartridge according to claim 13, the door control port being adapted to allow a finger of the disk drive to extend through the door control port and into the passage.

* * * * *